United States Patent
O'Brien

(10) Patent No.: US 10,239,381 B2
(45) Date of Patent: Mar. 26, 2019

(54) VEHICLE ROOF FAN

(71) Applicant: TSI Products, Inc., Arlington, TX (US)

(72) Inventor: Stephen William O'Brien, Fort Worth, TX (US)

(73) Assignee: TSI Products, Inc., Arlington, TX (US)

( * ) Notice: Subject to any disclaimer, the term of this patent is extended or adjusted under 35 U.S.C. 154(b) by 0 days.

(21) Appl. No.: 15/642,024

(22) Filed: Jul. 5, 2017

(65) Prior Publication Data
US 2018/0208016 A1    Jul. 26, 2018

Related U.S. Application Data

(60) Provisional application No. 62/449,400, filed on Jan. 23, 2017, provisional application No. 62/464,872, filed on Feb. 28, 2017.

(51) Int. Cl.
*B60H 1/00*    (2006.01)
*B60H 1/24*    (2006.01)
*B60H 1/26*    (2006.01)

(52) U.S. Cl.
CPC ..... *B60H 1/00742* (2013.01); *B60H 1/00207* (2013.01); *B60H 1/00385* (2013.01); *B60H 1/00792* (2013.01); *B60H 1/00885* (2013.01); *B60H 1/245* (2013.01); *B60H 1/262* (2013.01); *B60H 2001/00235* (2013.01)

(58) Field of Classification Search
CPC ............ B60H 1/00742; B60H 1/00207; B60H 1/00385; B60H 1/00792; B60H 1/00885; B60H 2001/00235
USPC ......................................................... 165/202
See application file for complete search history.

(56) References Cited

U.S. PATENT DOCUMENTS

| 4,672,818 A | * | 6/1987 | Roth | ................. | B60H 1/00364 62/239 |
| 5,112,535 A | * | 5/1992 | Roberson | ............. | B60H 1/3202 261/106 |
| 5,878,809 A | * | 3/1999 | Heinle | ............... | B60H 1/00742 165/203 |

(Continued)

FOREIGN PATENT DOCUMENTS

| DE | 102015111442 A1 | * | 1/2017 | ......... B60H 1/00742 |
| EP | 1120610 B1 |   | 8/2006 | |

(Continued)

OTHER PUBLICATIONS

DE102015111442A1 English Machine Translation—Retrieved Aug. 2017.*

(Continued)

*Primary Examiner* — Len Tran
*Assistant Examiner* — Jenna M Hopkins
(74) *Attorney, Agent, or Firm* — Hitchcock Evert LLP

(57) ABSTRACT

A vehicle roof fan for providing air conditioning to a user of a vehicle. The vehicle roof fan may include a plurality of individually controlled fans. The apparatus includes power management features to limit the power consumption, such as a user presence detector and/or battery threshold monitoring. The plurality of fans may be associated with one or more optical sensors that each control the operation of one or more of the fans based upon the presence of a user. The air conditioning apparatus may also include heating and/or cooling components to modify the air temperature from the apparatus.

17 Claims, 17 Drawing Sheets

(56) References Cited

U.S. PATENT DOCUMENTS

| | | | | |
|---|---|---|---|---|
| 6,027,137 | A * | 2/2000 | Rura | A47C 7/66 261/DIG. 3 |
| 6,325,362 | B1 * | 12/2001 | Massey | B60H 1/3202 261/127 |
| 6,357,249 | B1 * | 3/2002 | Robinson | B60H 1/00364 62/244 |
| 6,435,293 | B1 * | 8/2002 | Williams | B60H 1/00392 180/65.1 |
| 6,588,833 | B2 * | 7/2003 | Strommer | B60H 1/00464 296/214 |
| 6,935,944 | B2 * | 8/2005 | Bigelow, Jr. | B60H 1/00407 454/143 |
| 8,398,145 | B2 * | 3/2013 | Russ | B60H 1/00407 296/102 |
| 8,814,639 | B1 * | 8/2014 | Mecozzi | F04D 27/004 415/119 |
| 9,677,782 | B1 * | 6/2017 | Mecozzi | F24F 11/04 |
| 2003/0172156 | A1 * | 9/2003 | Price | B60H 1/00742 709/225 |
| 2003/0193390 | A1 | 10/2003 | Muramatsu | |
| 2004/0221598 | A1 * | 11/2004 | Hille | B60H 1/00371 62/244 |
| 2006/0246834 | A1 * | 11/2006 | Masumoto | B60H 1/00378 454/109 |
| 2007/0044492 | A1 * | 3/2007 | Ichikawa | B60H 1/00378 62/239 |
| 2007/0066207 | A1 * | 3/2007 | Smith | B60H 1/00592 454/69 |
| 2007/0262574 | A1 | 11/2007 | Breed et al. | |
| 2007/0293136 | A1 * | 12/2007 | Hancock | B60H 1/00264 454/143 |
| 2008/0060798 | A1 * | 3/2008 | Keen | B60H 1/00378 165/202 |
| 2008/0248736 | A1 * | 10/2008 | Aoki | B60H 1/00742 454/75 |
| 2009/0204297 | A1 * | 8/2009 | Friedman | B60H 1/00742 701/46 |
| 2009/0308565 | A1 * | 12/2009 | Jones | B60H 1/00407 165/41 |
| 2013/0232996 | A1 * | 9/2013 | Goenka | B60N 2/56 62/3.61 |
| 2014/0229059 | A1 * | 8/2014 | Surnilla | B60H 1/00785 701/36 |
| 2015/0375599 | A1 * | 12/2015 | Esposito | B60H 1/00742 701/36 |
| 2016/0047387 | A1 * | 2/2016 | Butcher, Jr. | F04D 25/14 417/53 |
| 2016/0069262 | A1 * | 3/2016 | Allam | F01K 13/00 60/783 |
| 2016/0082808 | A1 * | 3/2016 | Perkins | B60H 1/00742 165/11.2 |
| 2016/0221418 | A1 * | 8/2016 | Stover | B60H 1/245 |
| 2016/0311288 | A1 * | 10/2016 | Mayo Mayo | B60H 1/00207 |
| 2017/0043647 | A1 * | 2/2017 | Vergamini | B60H 1/3202 |
| 2018/0105020 | A1 * | 4/2018 | Smith | B60J 7/1642 |

FOREIGN PATENT DOCUMENTS

| | | | | |
|---|---|---|---|---|
| EP | 2505403 A2 * | 10/2012 | | B60H 1/00207 |
| GB | 2513694 A * | 11/2014 | | F24F 11/0034 |
| WO | 2009157731 A2 | 12/2009 | | |
| WO | WO 2014185033 A1 * | 11/2014 | | F24F 11/0034 |
| WO | WO 2015065495 A1 * | 5/2015 | | B60H 1/00207 |

OTHER PUBLICATIONS

WO2014185033 English Machine Translation—Retrieved Aug. 2017.*
Chapter 10 Automobiles American Society of Heating, Refrigerating and Air-Conditioning Engineers, Inc.. (2015). 2015 ASHRAE Handbook—Heating, Ventilating, and Air-Conditioning Applications (SI Edition).*
Ventline Vanair Roof Vent, Ventline website, http://ventline.com/i/u/6148923/f/rv_lit/vanair_vent_11-11.pdf, as printed Mar. 21, 2017.
Maxxair—High Powered Ceiling Fans for RVs, Maxxair website, http://www.airxcel.com/maxxair/products/fans, as printed Mar. 21, 2017.
International Searching Authority, PCT International Search Report for PCT/US18/14635, dated Mar. 26, 2018.

* cited by examiner

VEHICLE ROOF FAN

CROSS-REFERENCE TO RELATED APPLICATION

This application claims the benefit of priority from U.S. Provisional Application Nos. 62/449,400 filed on Jan. 23, 2017 and 62/464,872 filed on Feb. 28, 2017, which are incorporated herein by reference.

FIELD OF THE DISCLOSURE

The invention relates generally to the field of heating and cooling devices.

BACKGROUND

Heaters or fans have been mounted within vehicles that do not have integrated heating and air conditioning systems in order to provide comfort to the user. Many vehicles, such as golf carts, off-road vehicles, boats, tractors, etc. do not include heating and air conditioning capabilities.

In addition, the inclusion of heaters and air conditioning devices draws additional power from the vehicle battery in order to operate. Electric vehicles that operate on a limited battery charge, such as golf carts, must be recharged when the battery charge level falls below a minimum charge. When electric heaters or air conditioners draw power from the vehicle battery for operation, the charge of the battery drops faster and requires the battery to be charged more frequently.

SUMMARY

The present disclosure provides an apparatus for improved heating and/or air conditioning a vehicle. The apparatus may be used in vehicles including but not limited to all-terrain vehicles (ATVs), boats, snow mobiles, tractors, farm equipment, motorcycles, golf carts, electric vehicles, etc. While the apparatus is discussed in the context of vehicles, embodiments of the apparatus may also be used in other apparatuses and environments.

Embodiments of the apparatus provide a housing that includes a plurality of fans and openings for intake and output of air. Some embodiments of the housing are configured to mount in the roof of a vehicle with air intake from above the roof of the vehicle and air output within the vehicle. During operation, the fans cause air to flow through the housing from the upper portion of the housing to the outlet of the housing. Embodiments of the apparatus include power management features to control operation of one or more of the plurality of fans independent of other fans.

Embodiments of the housing may include multiple housing structure components that comprise the housing. For example, the housing may comprise an upper housing structure and a lower housing structure that define an open compartment within the housing. Some embodiments include a plurality of fans mounted within the compartment. In some embodiments, the lower housing component is attached from the bottom of an opening in a roof and the upper housing is attached from the top of an opening in the roof. The housing components may include a flange that extends beyond the opening in the roof and creates a seal to prevent leaking into the vehicle when attached.

Some embodiments of the housing may include three component parts, such as an upper housing structure, lower housing structure and a central housing structure. In some embodiments, the housing may include a rain shield to limit the likelihood of rain entering the housing. In some embodiments, the rain shield extends outward from the housing with a raised section to direct rain away from the air intake.

Embodiments of the housing may be configured with an air intake opening in the upper portion of the housing which is covered by an overhang of the top portion of the housing. The overhang may be designed to limit rain and/or other items from entering the compartment within the housing where the fans are located.

Embodiments may include one or more output vents. Each vent may be operable to direct the air from a fan toward specific locations in the vehicle. In some embodiments, each vent may be adjustable to alter the direction of airflow out of the apparatus.

Embodiments of the apparatus include one or more controls for the fans. In some embodiments, one or more fans may be controlled by a single user interface component, such as a switch, knob, button or other control interface. In some embodiments, the control feature allows speed control or other feature control of the fan(s).

In some embodiments, the apparatus is powered by a vehicle battery. In some embodiments, the apparatus includes a power source. Some embodiments may include a solar panel built into the top of the apparatus to provide power to the fans and any incorporated control electronics. Embodiments may also include power storage devices, such as batteries. In some embodiments including a solar panel or other power source, the power stored and/or generated in the apparatus may be the sole power for the apparatus or supplemental power in addition to a vehicle battery or other external power source.

Embodiments of the apparatus also include power management features. In some embodiments, the power management features may include one or more user detection systems to identify if a user is present. For example, the user detection system may utilize an optical sensor to determine whether the driver is present. In some embodiments, the system may include a plurality of user detection elements, with each associated with one or more locations in the vehicle. Each user detection system may operate to control the operation of a fan associated with the same location the user detection system monitors, whereby the user detection system turns the fan on when the user is present and turns the fan off when the user is not present.

Embodiments of the power management features may include battery monitoring and device shut-off features. For example, the control circuit may shut off the apparatus and/or features thereof when the battery charge level reaches a minimum threshold level.

In some embodiments, the apparatus may be configured to operate on a single fan. Embodiments may include multiple output vents. Each vent may be operable to direct the air from a fan toward specific locations in the vehicle. In some embodiments, each vent may be adjustable to alter the direction of airflow out of the apparatus.

Embodiments of the apparatus may also include a heater component and/or an air conditioning unit. The heater component and/or air conditioning unit may be located between the fan output and one or more vents to the users. In some embodiments, a heater component may include one or more positive thermal coefficient (PTC) heaters, electric coils and/or other heaters. In some embodiments, the air conditioning unit may include a water pump, a cool misting component and/or other air conditioning units. In some embodiments, the heating and cooling features are integrated in the same device. The heating and/or the cooling features may be located in a supporting component in some embodiments.

Some embodiments of the apparatus may include one or more lights. The lights may be located in the bottom housing of the apparatus. In such embodiments, the lights may be configured to provide light toward specific locations. Embodiments may include a light array configured to provide light to the driver and passenger seats of a vehicle. In some embodiments, the light array may be controlled by a control on the apparatus. In some embodiments, one or more lights may act as a control whereby the light may be pressed to actuate a control signal to turn on/off one or more of the lights. In some embodiments, lights are located in multiple portions of the apparatus housing.

Some embodiments of the apparatus may include an electronics port to facilitate connecting external components to the apparatus. Some embodiments may include speakers to play music and audio. Embodiments of the apparatus may incorporate a modular system having one or more ports to receive module components. For example, a plurality of optional module components—e.g. light modules, speaker modules, electronic port modules, etc.—may be configured to fit into the same port.

Some embodiments of the apparatus may include a wireless module to communicate with a remote device. Such a remote device may be configured to control the apparatus and/or monitor operational characteristics of the apparatus and/or vehicle. In some embodiments, the remote device may be a phone, tablet, watch or portable computing device. The remote device may control fans, air conditioning components, lights, speakers and/or other features in the apparatus. The remote device may also allow a user to monitor the mode of operation for the fans, the status of presence indicators, temperature output, ambient temperature, vehicle battery charge and/or other data.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein. As used herein, air conditioning may refer to conditioning of the air by heating, cooling, modifying speed of the airflow and/or other conditioning.

Figure 1:
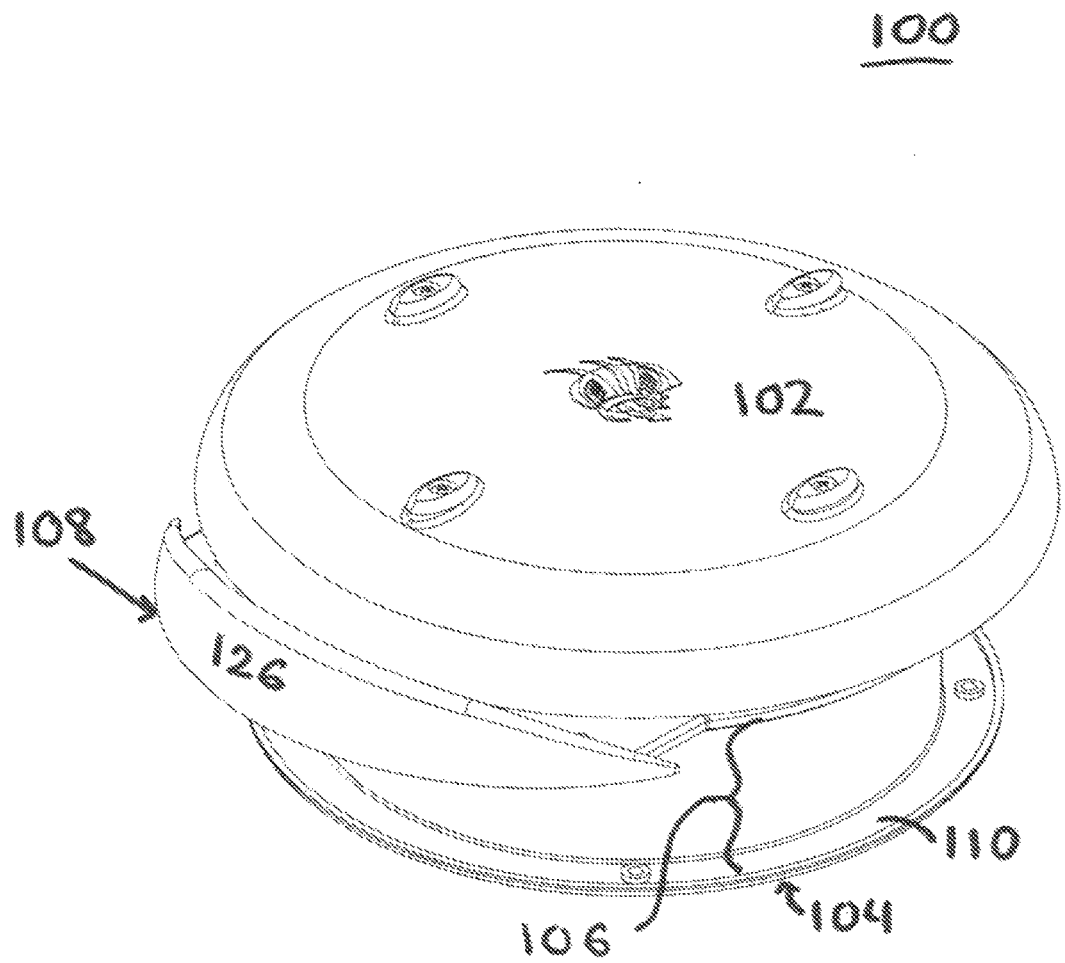
FIG. 1 is a top perspective view of an embodiment of a roof fan assembly.
Figure 2:
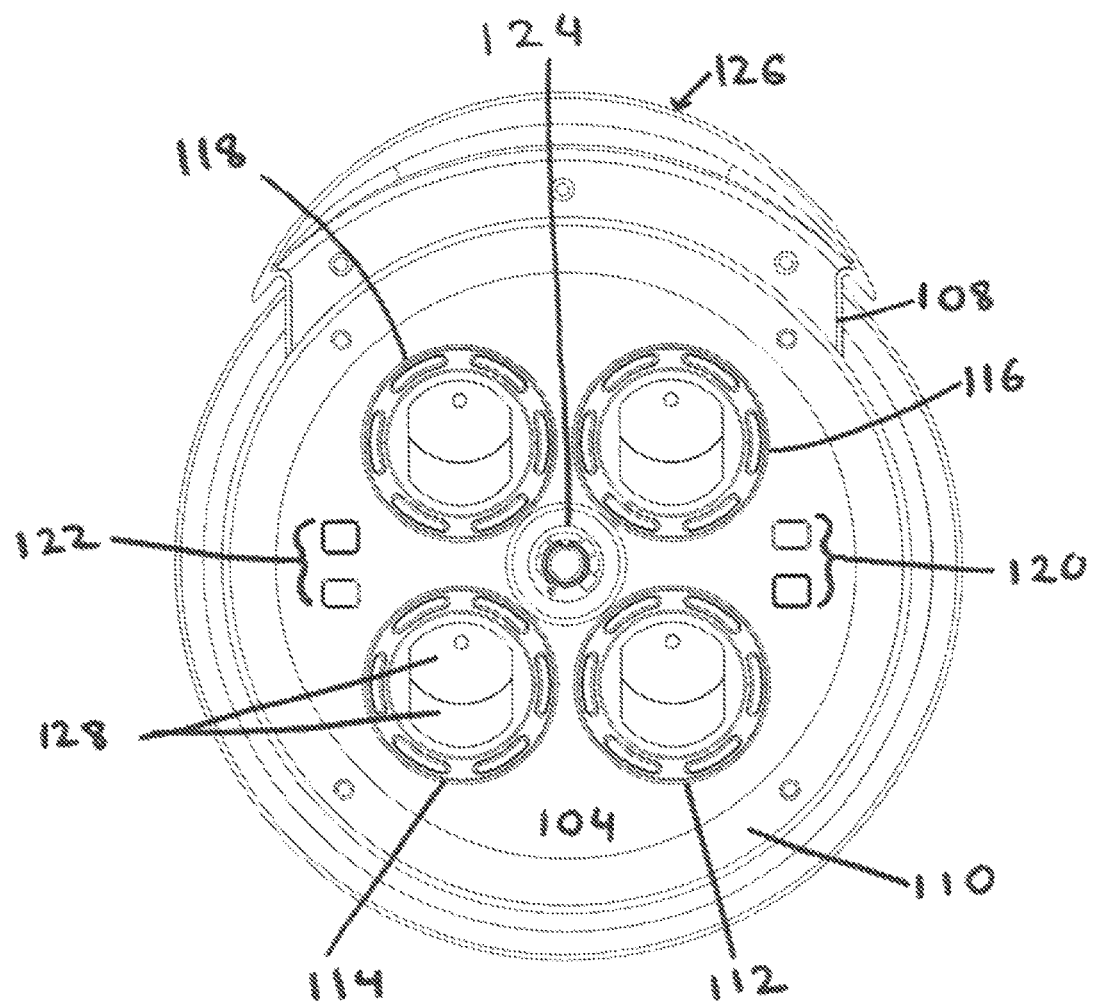
FIG. 2 is a bottom view of an embodiment of a roof fan assembly with closed vents.
Figure 3:
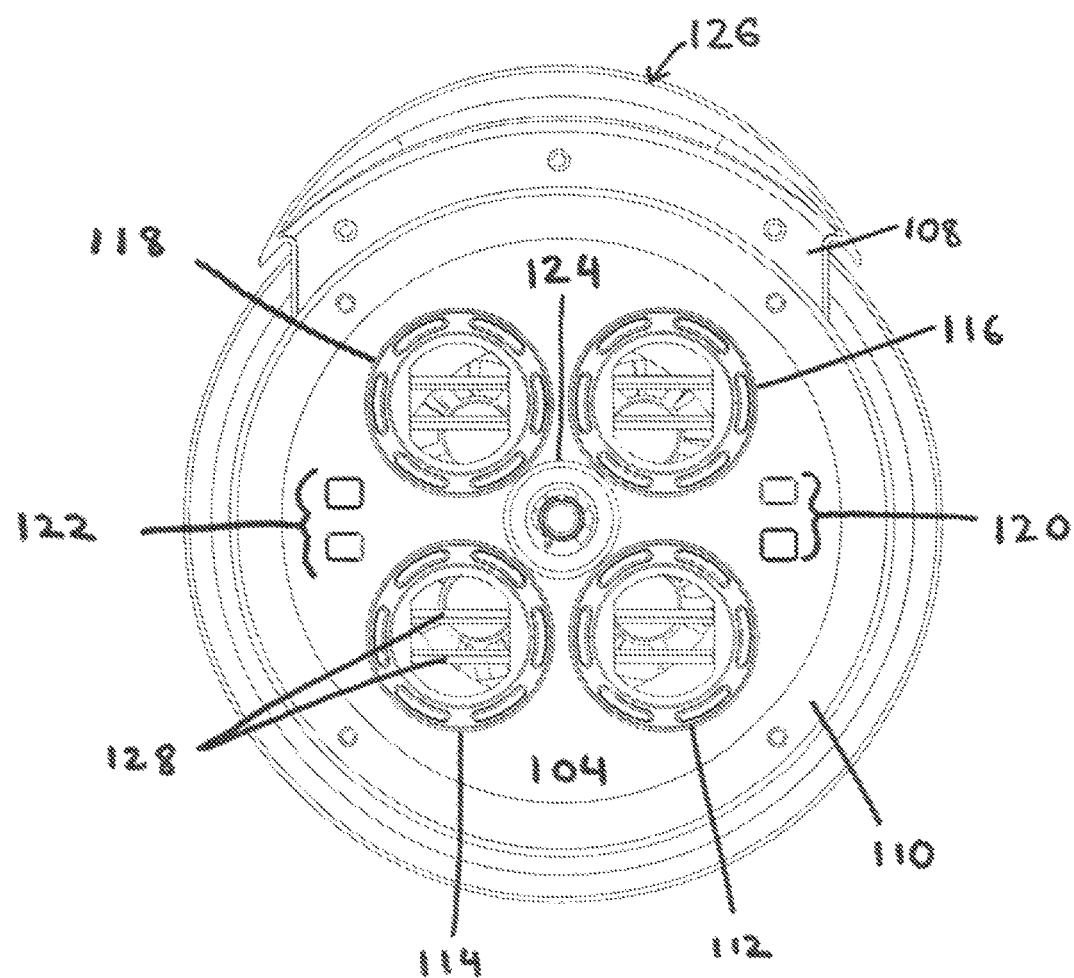
FIG. 3 is a bottom view of an embodiment of a roof fan assembly with open vents.
Figure 4:
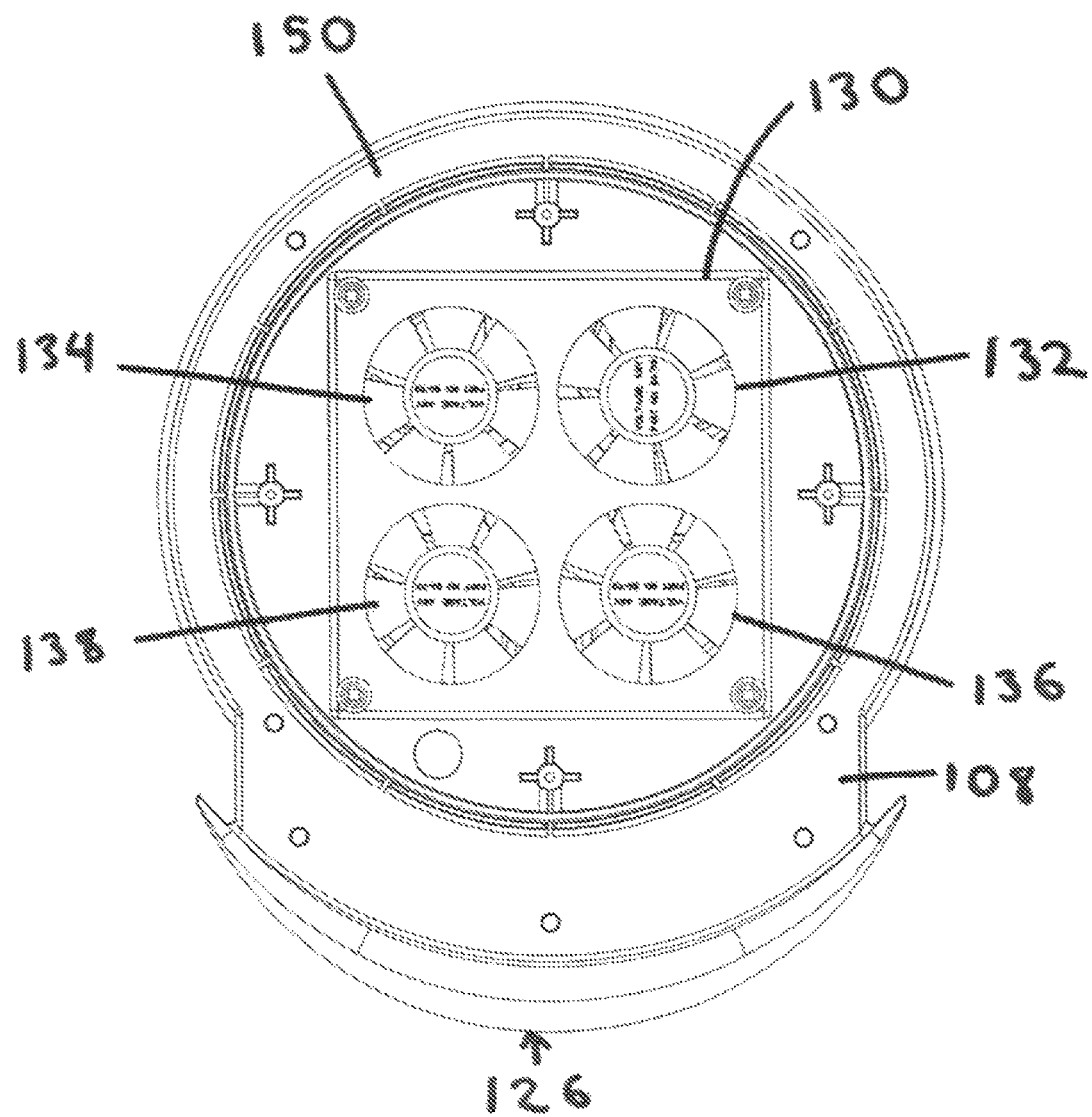
FIG. 4 is a top view of an embodiment of a roof fan assembly without a top.
Figure 5:
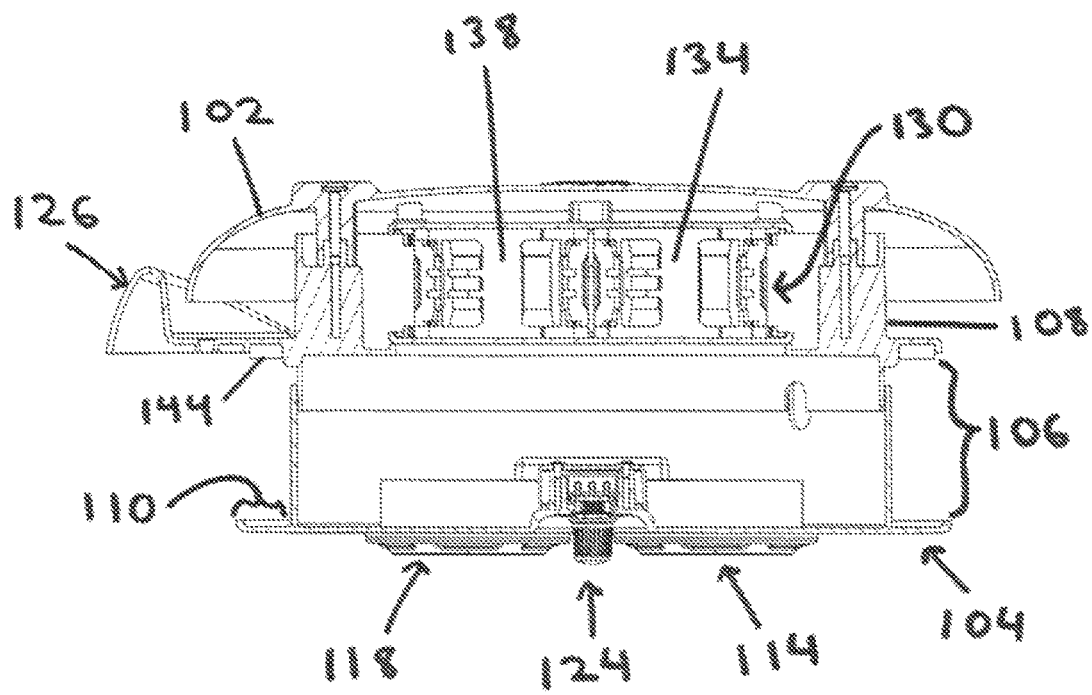
FIG. 5 is a side cross-section view of an embodiment of a roof fan assembly.
Figure 6:
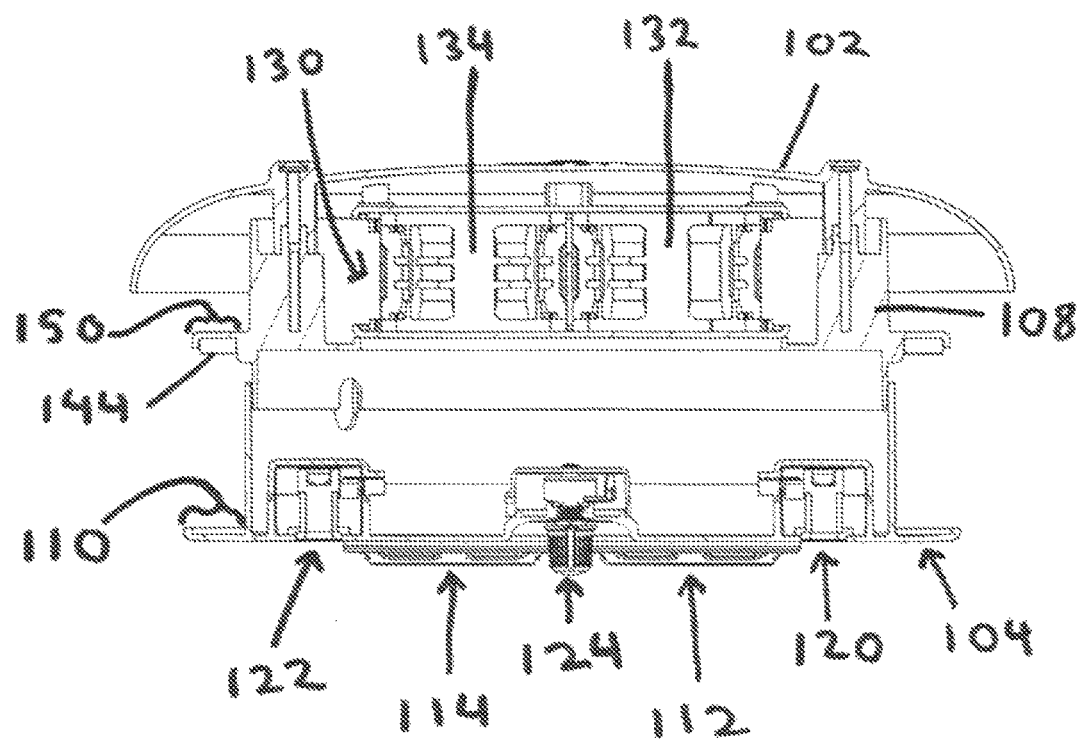
FIG. 6 is a front cross-section view of an embodiment of a roof fan assembly.

FIGS. 1-7 show a fan assembly 100 for installation in a vehicle roof. FIG. 1 illustrates the fan assembly 100 from a top-forward perspective view and FIGS. 2 and 3 illustrate the fan assembly 100 from a bottom view. FIG. 4 shows a top view of the fan assembly 100. FIGS. 5 and 6 show cross-section views of the fan assembly from a side and the front respectively. Finally, FIG. 7 further shows an exploded view of the fan assembly 100.

The fan assembly 100 shown includes a housing comprising an upper housing structure 102, a lower housing structure 104 and a central housing structure 108. In this embodiment, the lower housing structure 104 includes a flange 110 on the exterior lower portion of the lower housing structure 104. The central housing structure 108 in this embodiment also includes a flange 150 (shown in FIG. 4) and a rain shield 126 that is a raised structure configured to be in the forward or leading portion of the fan assembly 100 when installed in a vehicle. In some embodiments, the rain shield 126 may extend all around the fan assembly 100. In other embodiments, the rain shield 126 may extend only partially around the fan assembly 100. The rain shield 126 is configured to direct rain, dirt or other material away from the air intake of the fan assembly 100.

In this embodiment, the fan assembly 100 is configured to fit in a vehicle roof. When installed, the vehicle roof is fitted between the central housing structure 108 and the flange 110 of the lower housing structure 104 in gap 106. During installation, the lower housing structure 104, central housing structure 108 and/or upper housing structure 102 may be connected to each other and/or the vehicle roof in order to attach the fan assembly 100 to the vehicle roof. In some embodiments, the housing components are connected in a manner to create pressure on the roof to hold the fan assembly 100 in place. For example, the lower housing structure 104 may push up through an opening in the vehicle roof and be fitted to a lower portion of the central housing structure 108. In addition, the upper housing structure 102 may fit over the top of the central housing structure 108. Once the housing structures are fitted together, one or more connectors, such as bolts, may pass through the housing components and be used to compress the vertical axis of the fan assembly 100 causing the fan assembly 100 to connect to the vehicle roof by compressive force between the top of flange 110 and the bottom of the sealing ring 144 (shown in FIG. 5) and the flange 150 of the central housing structure 108.

In some embodiments, the fan assembly 100 is directly connected to the vehicle roof. For example, the housing components may be mounted directly to the roof using connectors, such as screws, bolts, clamps or other connectors. In some embodiments, one or more connectors may be replaced or bolstered with additional attachment features, such as adhesives and/or connectors built into the housing structure (e.g. threads, detents, clips, etc.). In this embodiment, the fan assembly 100 includes a sealing ring 144 beneath the flange 150 of the central housing structure 108. When the fan assembly 100 is installed, the sealing ring 144 creates a seal with the top of a vehicle roof. Embodiments may also include additional seals between the housing components and/or the vehicle roof to prevent leaks. For example, the fan assembly 100 may include rubber gaskets between the housing components and the roof.

Figure 7:
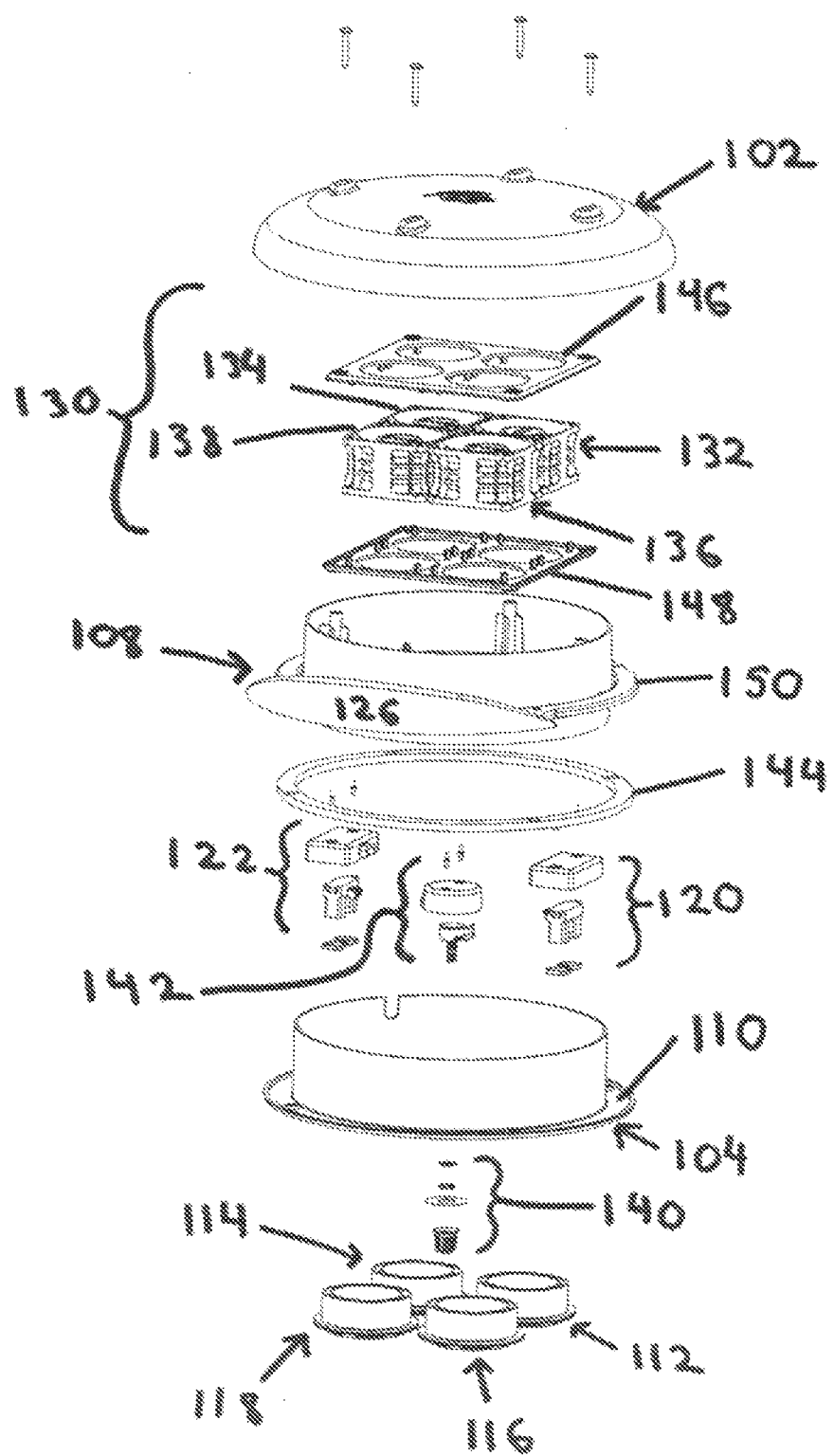
FIG. 7 is an exploded view of an embodiment of a roof fan assembly.

As shown in FIGS. 2 and 3, the lower housing structure 104 in this embodiment includes openings for four vents 112, 114, 116 and 118, two optical sensors 120 and 122 and a control switch 124 (shown in FIG. 7 as comprising a knob 140 and a rotatable control 142). In some embodiments, the fan assembly 100 includes fewer or more of these components. For example, an embodiment of the fan assembly 100 may include four optical sensors and two control switches. In some embodiments, the fan assembly 100 may include alternative arrangements of one or more of each of these components. Some embodiments may include alternative or different components than those shown. For example, the control switch 124 may be replaced with a digital control.

In some embodiments, each of the vents 112, 114, 116 and 118 may be independently adjustable to manage the airflow from the fan assembly. For example, one or more of the vents 112-118 may be closed as shown in FIG. 2 with the fins or louvers 128 in a closed position and/or one or more of the vents 112-118 may be open as shown in FIG. 3 with the fins or louvers 128 in an open position. In addition, the vents 112-118 may be rotatable to further adjust the direction of airflow from the fan assembly 100. In some embodiments, the vents 112-118 and fins 128 may be manually operable. In other embodiments, one or more features of the vents 112-118 and fins 128 may be mechanically controlled.

In this embodiment, each of the optical sensors 120 and 122 are configured to determine whether or not a person is within a certain distance of the fan assembly 100. In some embodiments, the optical sensors 120 and 122 operate as a power management feature by shutting off the device when a user is not present and restarting the device when the user returns. In some embodiments, each of optical sensors 120 and 122 may control features of the fan assembly 100. For example, one optical sensor 120 may be directed to the driver seat of an electric vehicle and control one or more fans providing air to the driver seat. In addition, another optical sensor 122 may be directed to a passenger seat of an electric vehicle and control one or more fans providing air to the passenger seat. In some embodiments, optical sensors may have alternative designs and/or be located in alternative locations. Alternative means of detecting the presence of a user may be integrated in some embodiments in addition to or instead of the optical sensors 120 and 122.

The control switch 124 operates as the user interface control in this embodiment, and is configured to turn the device on and select the state of operation. For example, the control switch 124 may select from four distinct operations including off, low speed, medium speed and high speed. The number and type of operations may vary depending on the fan assembly 100. For example, the control switch 124 may also be used to select operation of a heater and/or cooling feature of the fan assembly 100 in some embodiments. In some embodiments, the control switch 124 may include relative options similar to a dimmer switch to select a desired output within a range. One having ordinary skill in the art will recognize that alternative control/user interface options may be implemented in the place of control switch 124, including additional analog controls, digital controls, buttons, knobs, switches and/or other controls or combinations of different types of controls. In some embodiments, the fan assembly 100 may incorporate elements (such as near field wireless communication elements) to facilitate remote control features for managing operation of the fan assembly 100. In such designs, a person's phone or other wireless device may be used to operate the fan assembly 100.

In some embodiments, the fan assembly 100 may include a visual output, such as an LED, display, light array, etc., to indicate the status of the device. During operation, the output of the visual output may change to reflect a different operational state of the device. For example, when the device is powered and turned off, the visual output may provide a steady red light. The visual output may provide a green light when the control switch 124 is turned to a first setting. The visual output may provide an orange light when the control switch 124 is turned to a second setting. The visual output may provide a blinking light when the control switch 124 is turned to a third setting. Other embodiments may utilize alternative indications for various states of operation that include blinking patterns, a variety of colors and/or other outputs. Other embodiments may include additional and/or alternative visual outputs to indicate the status of the device. For example, a display may be included to visually show the current operational state of the device. For another example, an array of lights/LEDs may be used wherein each light/LED may indicate different alternative states of operation. In some embodiments, other outputs may be used with or instead of the visual output, such as audible outputs, mechanical outputs and/or other outputs.

The housing components define a compartment in which a fan array 130 is mounted in this embodiment. The fan array 130 shown includes four fans 132, 134, 136 and 138. In some embodiments, the fans 132-138 may be collectively controlled through the control switch 124 and the optical sensors 120 and 122. Each of the fans 132-138 may be independently controlled through the control switch 124 and the optical sensors 120 and 122 in other embodiments. One having ordinary skill in the art will recognize that one or more of the fans 132-138 may be collectively or independently controlled. In some embodiments, certain controls may apply to all fans 132-138 while other controls may apply to less than all fans 132-138.

In some embodiments, alternatives to fan array 130 may be included in the internal compartment of the housing components. For example, the fan array 130 may be replaced with a single fan. For another example, the fan array 130 may include more than four fans 132-138. In some embodiments, alternative fan designs may be included.

In the embodiment shown, the fan array 130 is located in an upper portion of the internal compartment within the housing components. As shown in FIGS. 5 and 6, the fan array 130 is mounted between the central housing structure 108 and the upper housing structure 102. The fans 132-138 are configured in the fan array 130 to move air through air intake openings and downward toward the vents 112-118.

In this embodiment, the air intake openings are open areas between the upper housing structure 102 and the central housing structure 108. In some embodiments, air intake openings may include holes through one or more of the housing components. In this embodiment, the edge of the upper housing structure 102 extends beyond the connection with the central housing structure 108 and drops below the air intake openings. This configuration forces air to pass below the outer edge of the upper housing structure 102 and then lift upward under the upper housing structure 102 to enter the air intake openings. This airflow requirement helps to limit rain and/or other debris from entering the open compartment within the housing of the fan assembly 100. In addition, air must pass over the rain shield 126 on the front of the fan assembly 100 further limiting the likelihood of rain and/or debris entering the internal compartment of the fan assembly 100 from the front.

The embodiment shown includes additional space in the internal compartment below the fan array 130 and above the control switch 124 and vents 112-118. In some embodiments, this additional space may include additional components, such as a heater, a cooler, additional fans, additional control electronics, a power supply, air ducts, air vanes, sectioning walls and/or other components. In some embodiments, the additional space may allow variability in the gap 106 designed to fit a vehicle roof.

FIG. 7 shows an exploded view of the fan assembly 100 illustrating additional detail of the fan assembly 100. In this embodiment, the fan array 130 comprises a frame having an upper frame element 146 and a lower frame element 148 that each have four openings. The frame elements 146 and 148 are located on opposite ends of the fans 132-138 and hold the fans 132-138 in place when the fan assembly 100 is assembled.

As discussed above, the control switch 124 comprises a knob 140 and a rotatable control 142, such as a potentiometer, in this embodiment. As the knob 140 rotates, the rotatable control 142 causes a control module for the fan assembly 100 to modify the operation of the fan assembly 100. In some embodiments, the rotatable control 142 may be correlated to certain selectable settings along the rotation. Other versions of the fan assembly 100 may use an alternative user interface that includes alternative components and/or elements to those shown. In addition, the control switch 124 and optical sensors 120 and 122 may include the control module, such as an integrated circuit, relay or other control mechanism, to facilitate operation of the fan assembly 100 based on control signals from the control switch 124 and the presence of a user as detected by the optical sensors 120-122. In some embodiments, the control module is located in the rotatable control 142. Other embodiments may include the control module integrated with other electronic components, such as the optical sensors 120 and 122, the fan array 130 and/or another electronic component. In some embodiments, the control module may be a separate electronic component operably associated with the fans 132-138, the optical sensors 120 and 122, the control switch 124 and/or additional components.

While the following discussion of the operation of the fan assembly 100 is in the context of application in a golf cart, the fan assembly 100 may be used in other contexts/environments as discussed above and the description of the operation is applicable to other contexts as will be understood by one skilled in the art. An installer may install the fan assembly 100 in the golf cart. The installer may securely fit the lower housing structure 104 upward through a hole in the roof of a golf cart and the central and upper housing structures 102 and 108 to the top side of the roof of the golf cart corresponding to the lower housing structure 104 in order to form the fan assembly 100. The installer may use one or more connectors to attach the fan assembly 100 to the roof of the golf cart with the rain shield 126 oriented to the front of the golf cart. In some embodiments, the user will assemble the fan assembly 100 by connecting the central and upper housing structures 102 and 108 prior to installation. In other embodiments, the user may place or install the housing components in other orders to achieve the final fan assembly 100. As part of the installation, an installer may connect the fan assembly 100 to a power source, such as the golf cart battery. Connection of the fan assembly 100 to a battery may not be required for some embodiments of the fan assembly 100 that include a power source.

After installation of the fan assembly 100, the user may turn on the fan assembly 100 using the control switch 124. For example, the user may turn the control switch 124 to one of a plurality of settings, such as low fan, high fan and/or another setting. When the fan assembly 100 is turned on, the electronic components are initiated including the optical sensors 120 and 122 and one or more fans 132-138 associated with the control switch 124. In some embodiments, the control switch 124 operates a control module to manage operation of each of the fans 132-138 and/or other elements based upon the selected setting. In embodiments having multiple control switches 124, each control switch 124 may separately control a different fan or group of fans 132-138.

During operation, the fans 132-138 blow air through the fan assembly 100 and out the vents 112-118. The user may adjust the control switch 124 to change settings. One skilled in the art will recognize that embodiments with alternative control mechanisms (e.g. buttons, switches, touch screen controls, etc.) and/or components may facilitate different operations and/or settings options.

As discussed above, the user may also move the adjustable vents 112-118 to direct air at a desired location. For example, the user may rotate and angle the adjustable vents 112 and 116 to direct air towards the driver. Alternatively, the user may angle the adjustable vents 114 and 118 to direct air towards the passenger. As another alternative, the user may close the adjustable vents 112 to direct more air out through the vents 114-118.

In some embodiments, the fan assembly 100 includes power management features to minimize power consumption while providing airflow to the user. The optical sensors 120 and 122 may facilitate power management features by limiting the operation of one or more of fans 132-138 based upon the presence of a user. For example, the optical sensor 120 may be associated with fans 132 and 136 and directed to the driver seat. In such an embodiment, optical sensor 120 may provide data to a control module to allow the control module to limit operation of the fans 132 and 136 based upon the presence of a user in the driver seat. Similarly, the optical sensor 122 may be associated with fans 134 and 138 and directed to the passenger seat. In such an embodiment, optical sensor 122 may provide data to a control module to allow the control module to limit operation of the fans 134 and 138 based upon the presence of a user in the passenger seat.

During operation, the optical sensors 120 and 122 operate to determine whether a person is within a given distance. For example, the optical sensors 120 and 122 may use a light output and a light sensor to determine a range to the nearest object in the directed line (or lines) of sight. If the range is above a threshold distance based on the expected distance to a user, one or both of the optical sensors 120 and 122 (or a separate control module in some embodiments) may determine that a person is not present and shut-off one or more fans 132-138 to limit power consumption while the user is not present. The optical sensors 120 and 122 may continue to detect the relevant distance to the nearest object and may control one or more of fans 132-138 to resume the operation associated with the user's prior setting selection when the range detected by the optical sensors 120 and 122 indicates a person is present again.

In some embodiments, the fan assembly 100 may include an initializing mode wherein each of the optical sensors 120 and 122 may be used to determine a distance to a set object, such as a seat in a vehicle, and an operational mode that uses the distance determined in the initializing mode as a threshold distance. The fan assembly 100 may determine the presence of a person when the distance indicated by one of the optical sensors 120 and 122 is sufficiently less than the threshold distance for the optical sensor 120 and/or 122. The distance may be sufficiently less when the difference is more than a standard deviation that could represent error in the distance calculation. Alternatively, the fan assembly 100 may include a set requirement for the difference that is indicative of a person sitting in the seat. One skilled in the art will recognize that other presence detectors may be used with or instead of the optical sensors 120 and 122 to facilitate power management based on the presence of a user.

In some embodiments, the optical sensors 120 and 122 will detect the applicable distance multiple times in order to verify the accuracy of the detected distance and limit the likelihood of turning one or more features of the fan assembly 100 on or off based on an errant distance reading, an anomaly and/or another temporary change (e.g. a person reaches across the optical sensor 120 momentarily without getting in the vehicle). For example, the optical sensors 120 and 122 may confirm the current distance every few seconds until a new distance is detected. Upon detecting the new distance, one or both of the optical sensors 120 and 122 may increase the rate of distance readings to confirm that the new distance is accurate and indicates the presence of a person has changed.

In some embodiments, the optical sensors 120 and 122 operate solely as the optical output and input and sends the detected data to a control module for processing the distance and further action by the fan assembly 100, if applicable. In some embodiments, the optical sensors 120 and 122 include internal processing features for determining one or more results. For example, one of the optical sensors 120 and 122 may receive the detected data, calculate the distance and send the distance result to a control module in the fan array 130. For another example, one of the optical sensors 120 and 122 may receive the detected data, calculate the distance and determine whether a change in distance has occurred. In such an embodiment, the optical sensor 120 or 122 may only send a signal to the fans 132-138 or a control module when the distance has changed. One skilled in the art will recognize that various embodiments may include one or more features of the processing in the optical sensors 120 and 122 and/or a control module.

Figure 8:
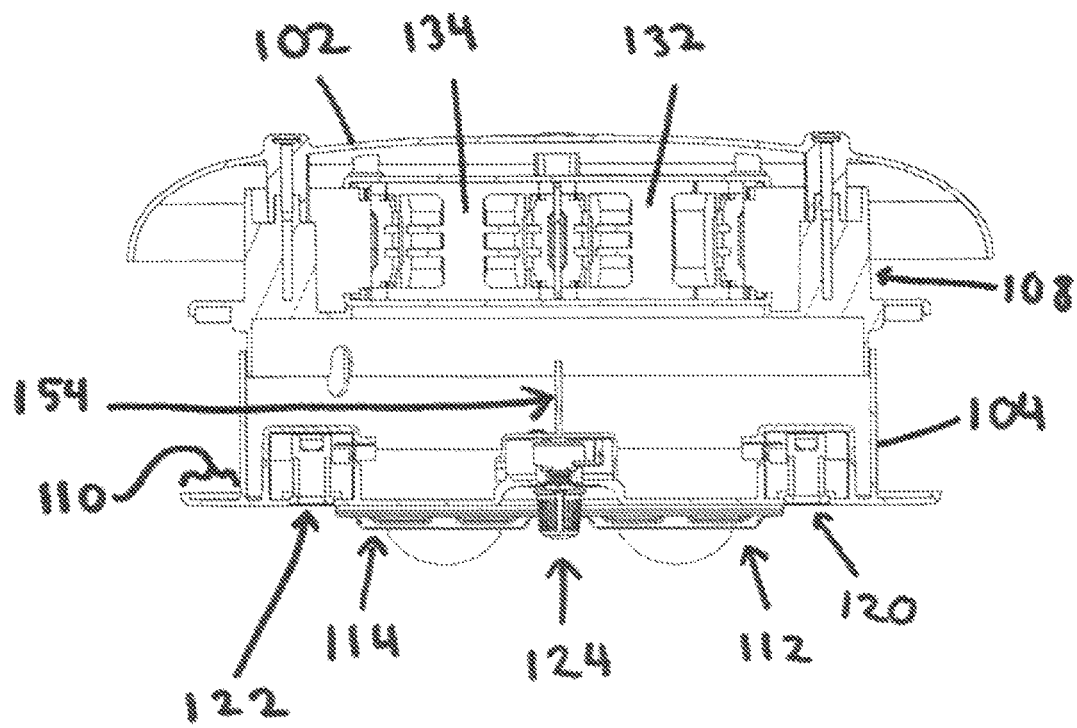
FIG. 8 is a front cross-section view of an embodiment of a roof fan assembly with a sectioning wall.

FIG. 8 shows an alternative embodiment of the fan assembly 100 including a separation wall 154 in the internal compartment of the housing. In this embodiment, the separation wall 154 is below the fan array 130 and above the control switch 124. In the embodiment shown, the separation wall 154 extends from the front to the back of the fan assembly 100. The separation wall 154 is also configured to be located between the outputs of fans 132 and 136 on one side and fans 134 and 138 on the other side. In some embodiments, the separation wall 154 may be located in different locations within the internal compartment.

The separation wall 154 directs the flow of air from fans 132 and 136 to the vents 112 and 116 directly below the fans 132 and 136, and directs the flow of air from fans 134 and 138 to the vents 114 and 118 directly below the fans 134 and 138. In this embodiment, the separation wall 154 extends partially upward from the top of the control switch 124 toward the fan array 130. This design leaves room in the internal compartment for additional components, such as a heater, cooler and/or other component. In some embodiments, the separation wall 154 may extend to the bottom of the fan array 130.

Some embodiments of the fan assembly 100 may include a plurality of separation walls 154 configured to individually direct air between a specific fan 132-138 and a specific vent 112-118. For example, in addition to the separation wall 154 extending from the front to the back of the fan assembly 100, another separation wall 154 may extend from one side to the other side of the fan assembly 100 between fans 136 and 138 on the front side and fans 132 and 134 on the back side of the second separation wall 154. Embodiments of the fan assembly 100 may include additional separation walls 154 located on the outside of each fan 132-138 to further contain and direct the airflow from a specific fan 132-138 to a vent 112-118. In some embodiments, the fan assembly may include ducts, vanes, fins and/or other structures to direct the airflow from a specific fan 132-138 to a specific vent 112-118, in addition to one or more separation walls 154. In some embodiments, the airflow from one fan 132-138 may be directed to one or more vents 112-118. Alternatively, the airflow from multiple fans 132-138 may be directed to a single vent 112-118.

The inclusion of one or more separation walls 154 (or alternative features to direct airflow) improves individualized control of airflow to specific locations within a vehicle. For example, turning an individual fan 132-138 on or off based upon a user selection through a control switch 124 and/or power management features, such as the optical sensors 120 and 122, will control the airflow from the vent 112-118 associated with the individual fan 132-138.

Figure 9:
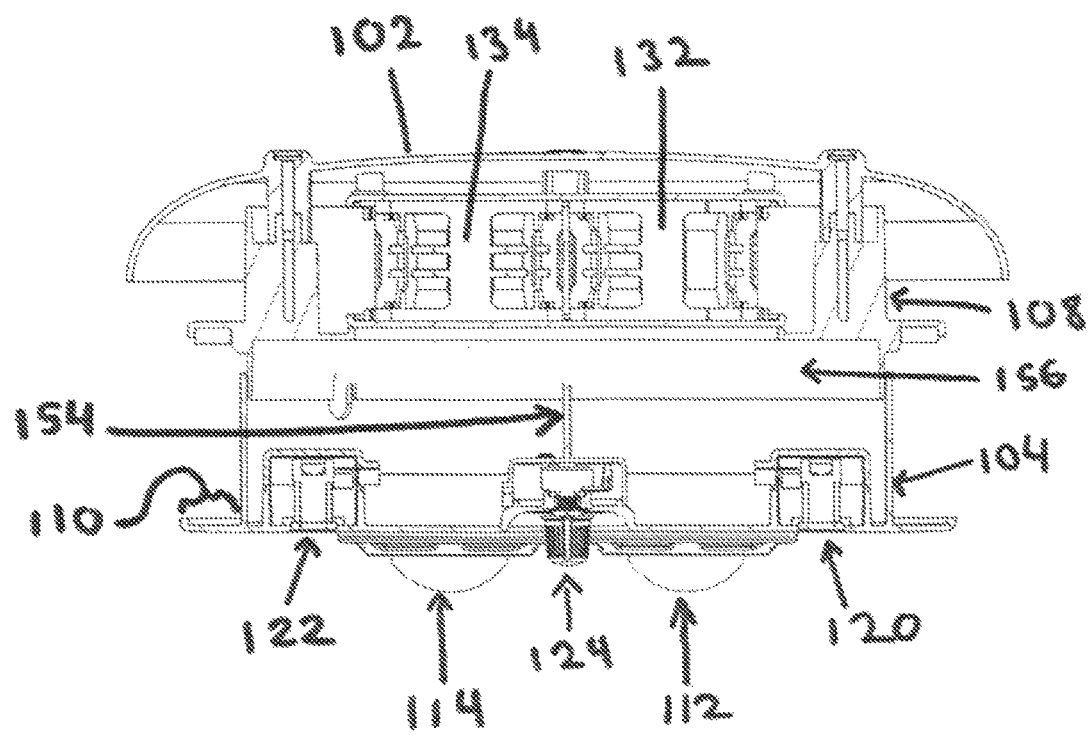
FIG. 9 is a front cross-section view of an embodiment of a roof fan assembly with a sectioning wall and a heater and/or air conditioning feature.

FIG. 9 shows another alternative embodiment of the fan assembly 100 including a separation wall 154 and an optional air conditioning component 156 in the internal compartment of the housing. The air conditioning component 156 is configured to modify the air from the fans 132-138 prior to the air exiting the vents 112-118. As discussed above, the air conditioning component 156 may be a heater, a cooling component, a mister, and/or another air conditioning element. In some embodiments, the air conditioning component 156 may comprise a plurality of PTC heaters configured to heat air from the fans 132-138 which then flows out of the vents 112-118 to provide heated air to the user. In some embodiments, the air conditioning component 156 may comprise a cooling system configured to cool air from the fans 132-138 which then flows out of the vents 112-118 to provide cooled air to the user. Embodiments of the air conditioning component 156 may comprise a water misting system configured to provide a mist in the air from the fans 132-138 which then flows out of the vents 112-118 to provide the mist to the user. Embodiments of the air conditioning component 156 may comprise a heater core and a cooling system configured to either heat or cool the air from the fans 132-138 depending on the user settings. When a user turns the control switch 124 to a heat setting, the heater core operates to heat the air. When a user turns the control switch 124 to a cooling setting, the cooling system operates to cool the air.

In some embodiments, the air conditioning component 156 may comprise a plurality of air conditioning components 156 each associated with the output of one of the fans 132-138. In addition, each of the plurality of air conditioning components 156 may be independently controlled using the control switch 124, the optical sensors 120 and 122 and/or a control module.

During operation of the fan assembly 100 including the air conditioning component 156, the user may turn on the fan assembly 100 using the control switch 124. For example, the user may turn the control switch 124 to one of a plurality of settings, such as low fan, high fan, low heat, high heat, low cool, high cool, mist and/or another setting. When the fan assembly 100 is turned on, the electronic components are initiated including the optical sensors 120 and 122, one or more fans 132-138 and/or air conditioning component 156 associated with the control switch 124. In some embodiments, the control switch 124 operates a control module to manage operation of each of the fans 132-138, the air conditioning component 156 and/or other elements based upon the selected setting. For example, the control module may turn one or more of the fans 132-138 to a first speed when the low fan setting is selected and to a second, higher speed when the high fan setting is selected. When the low heat setting is selected, the control module may turn on one or more of the fans 132-138 at a select speed and turn heater components to a low setting. For example, the module may turn some but not all PTC heaters in a PTC array. When the high heat setting is selected, the control module may turn on one or more of the fans 132-138 at another select speed and turn on a heater at a high setting. For example, the module may turn on all of the PTC heaters in the PTC array. Similarly, when a cooling setting is selected, the control module may turn on one or more of the fans 132-138 and a cooling element. The low and high cooling settings may be based upon the operation of the cooling element and/or the fan speed.

In some embodiments, the fan assembly 100 includes power management features to minimize power consumption while providing heating and cooling to the user. As discussed above, the optical sensors 120 and 122 may be used to limit the operation of one or more fans 132-138 based upon the presence of one or more users. In addition, some features may be limited in operation based upon other factors. For example, the air conditioning component 156 may only operate on a high heat or cooling level for a limited time. In some embodiments, the fan assembly 100 may include one or more features to monitor the charge of an attached battery and modify operation of the fan assembly 100 based upon the battery charge level. For example, the fan assembly 100 may receive or detect the charge level for the battery in an electric vehicle. If the battery charge level drops below a threshold charge level, the fan assembly 100 may automatically turn off. The threshold charge level may be preset by a manufacturer, selected by a user and/or determined by the fan assembly 100 based upon various factors, such as the type of battery, type of environment, battery usage rates and/or other factors. For example, when the fan assembly 100 is installed in a golf cart, the threshold level may be based upon the necessary battery level to ensure that the golf cart can be driven back to the clubhouse.

As shown in these figures, the fan assembly 100 is generally circular in shape. In some embodiments, the fan assembly 100 may be a different shape, such as an oval, a rectangle, a hexagon or any other shape. In some embodiments, the shape may be extended to facilitate individualized air control for vehicles with different passenger arrangement options. For example, an embodiment of the fan assembly 100 may be designed in an elongated elliptical shape with a set of forward fans 132-138 and vents 112-118 for a driver and passengers in a front seat and as set of rear fans 132-138 and vents 112-118 for a passengers in a back seat. Such embodiments may include separate control switches 124 and optical sensors 120 and 122 associated with the various potential passenger locations.

Some embodiments of the fan assembly 100 may be configured to mount within the vehicle. For example, the upper housing 102 may be mounted to the bottom surface of the vehicle roof with the air intake underneath the roof. In such an embodiment, the fan assembly 100 may pull air into the upper portion of the fan assembly 100 under the bottom surface of the roof and blow air toward one or more users below the fan assembly 100. In such embodiments, the upper surface of the fan assembly 100 may be flat and/or contoured to match the bottom surface of the roof. In addition, the housing may not include a rain shield 126.

Figure 10:
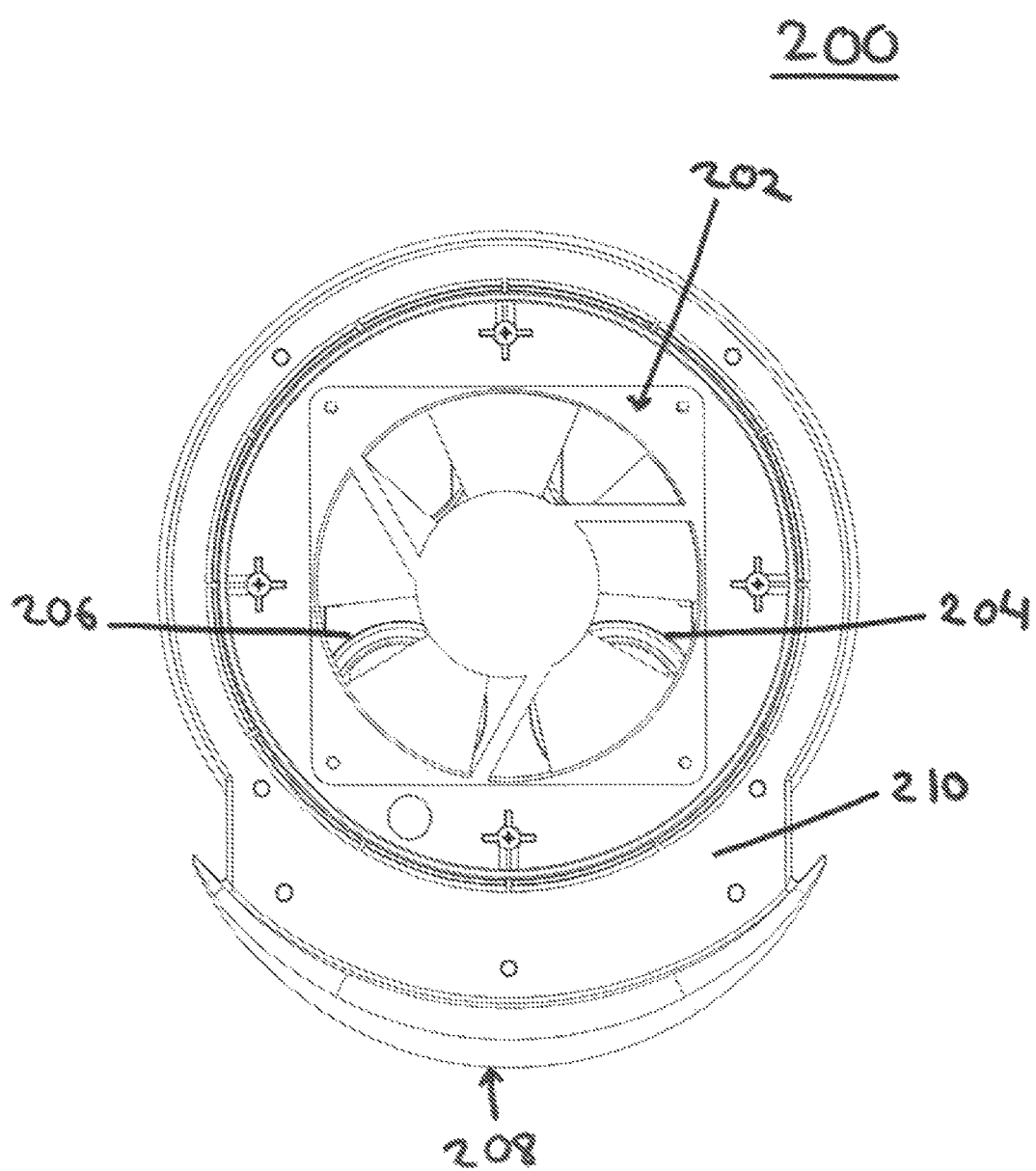
FIG. 10 is a top view of another embodiment of a roof fan assembly without a top.

FIG. 10 shows fan assembly 200 from a top view without an upper housing structure. Aspects of the fan assembly 200 may be the same as the fan assembly 100 discussed above. In this embodiment, the fan assembly 200 shows the central housing structure 210 with a rain shield 208. Instead of a fan array 130, this embodiment uses a fan 202 located in the internal compartment defined by the housing components. Embodiments of the fan assembly 200 may include a plurality of outlet vents, such as vents 204 and 206 seen through the fan 202. Other embodiments may only use one vent.

In addition, the fan assembly 200 may include one or more user interface components (e.g. control switch 124 above) and/or sensors (e.g. optical sensors 120 and 122 above). In some embodiments, the fan assembly 200 includes two optical sensors directed at different potential user locations. When the control switch is turned to an on setting, the optical sensors may be used to manage power consumption by turning the fan 202 off when both optical sensors indicate no user is present and turn the fan 202 on when either optical sensor indicates a person is present. In some embodiments, the speed of the fan may vary depending on whether both optical sensors detect users are present or only one of the optical sensors detects a user is present.

Figure 11:
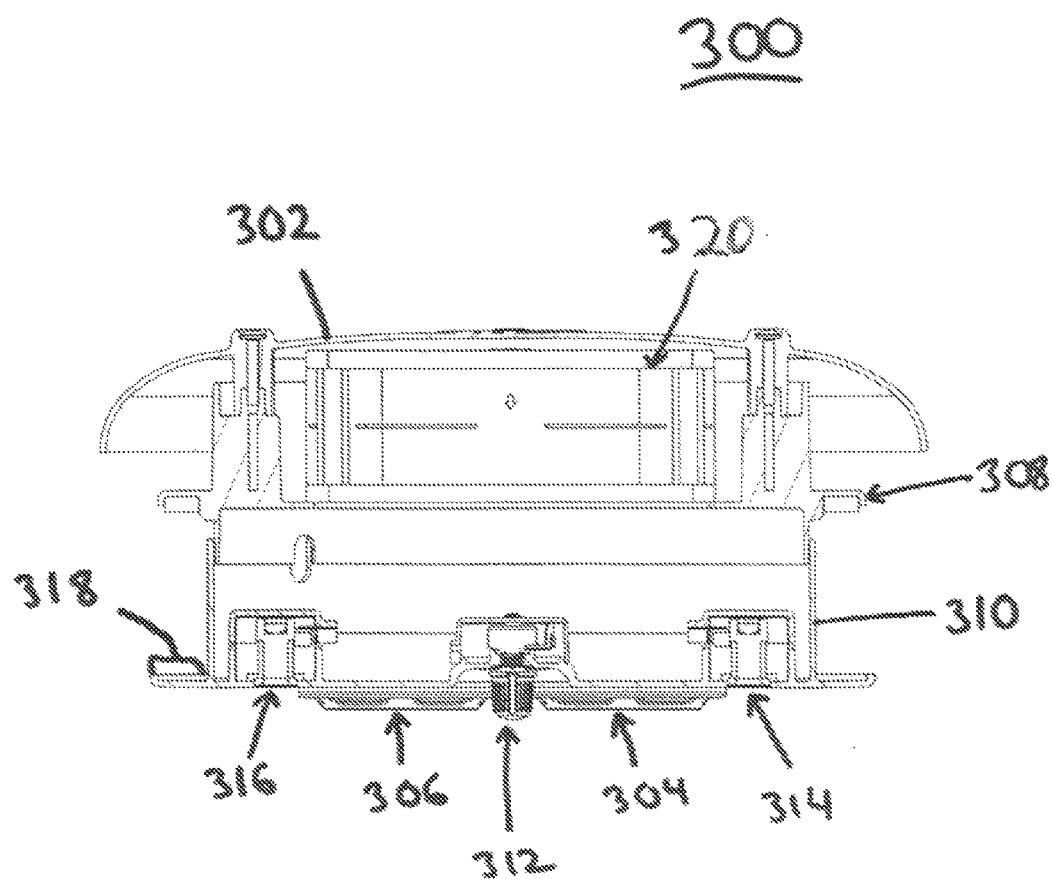
FIG. 11 is a side cross-section view of another embodiment of a roof fan assembly.

FIG. 11 shows a cross-section of fan assembly 300 from a side view. Aspects of the fan assembly 300 may be the same as the fan assemblies 100 and 200 discussed above. Similar to the housing structures described above, the fan assembly 300 shows an upper housing structure 302, a central housing structure 308 and a lower housing structure 310. Instead of a fan array 130 or fan 202, this embodiment includes an open compartment 320 located in the upper portion of the internal compartment defined by the housing components. In some embodiments, the open compartment 320 may be configured to accommodate one or more fans or air conditioning structures. Embodiments of the compartment 320 may facilitate replaceable components wherein a series of fans, fan arrays, air conditioners and/or other components may be configured to fit the structure of the compartment 320. Embodiments of the fan assembly 300 may include a plurality of outlet vents, such as vents 304 and 306, optical sensors 314 and 316, control switches 312 and/or other components.

Figure 12:
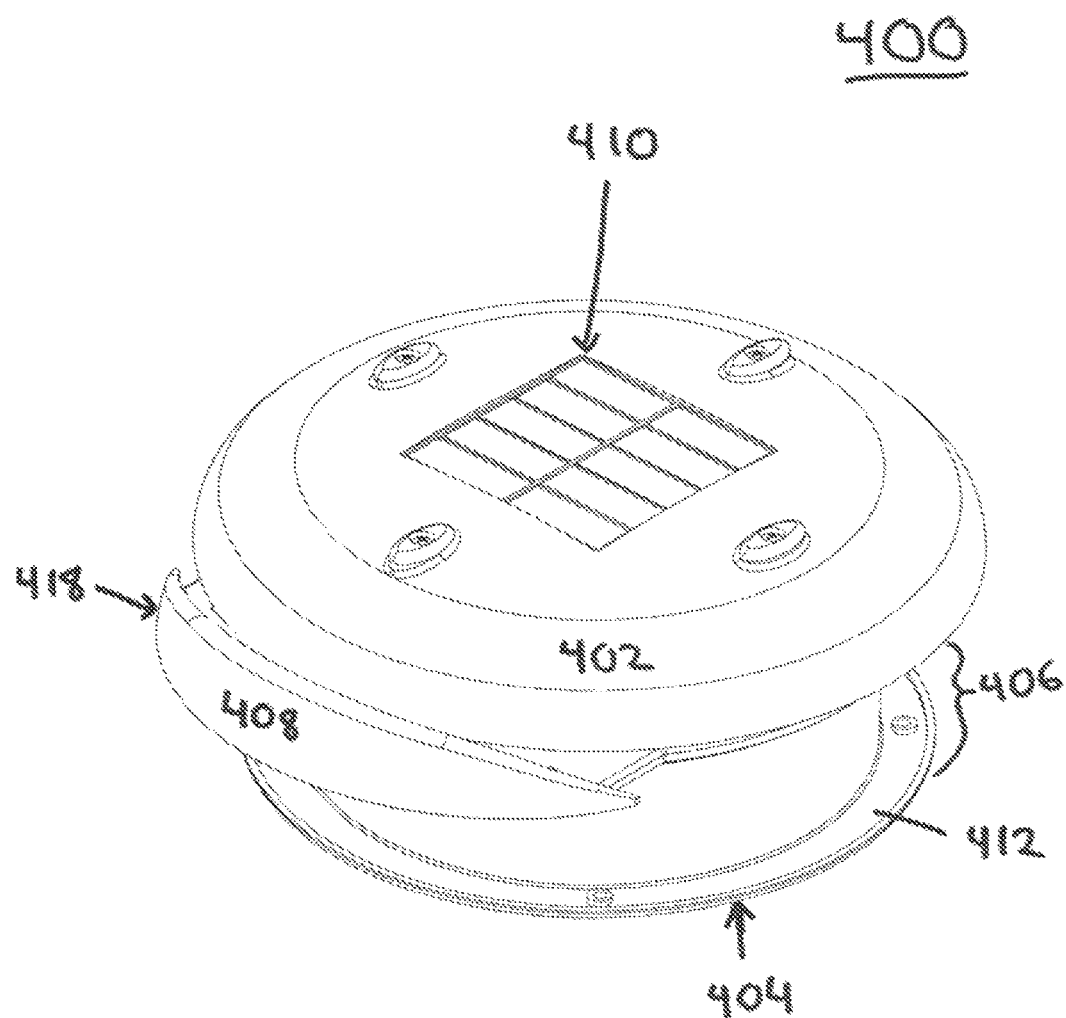
FIG. 12 is a top perspective view of an embodiment of a roof fan assembly with a solar panel.

FIG. 12 shows a perspective view of a fan assembly 400. Aspects of the fan assembly 400 are similar to fan assemblies 100, 200 and 300. The fan assembly 400 includes an upper housing structure 402, a central housing structure 418 (including a rain shield 408) and a lower housing structure 404 (including a flange 412). In this embodiment, the upper housing structure 402 includes a solar panel 410 to provide power to the fan assembly 400. As discussed further above, the solar panel 410 may generate power directly for the control of electronic components within the fan assembly 400, such as fans, optical sensors, control modules, air conditioning components and/or other electronics. In some embodiments, the solar panel 410 provides power to a storage component, such as a battery within the fan assembly and/or a vehicle battery associated with the fan assembly 400.

Figure 13:
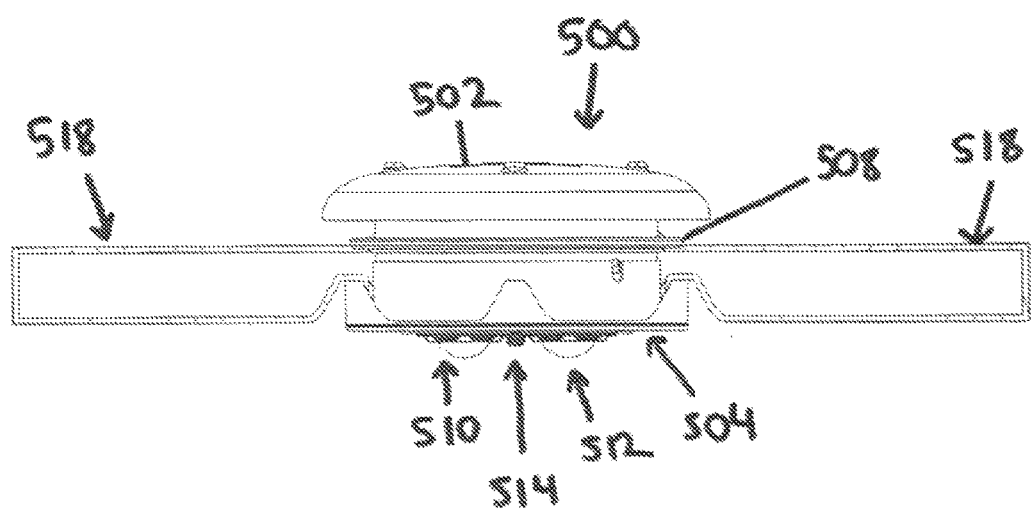
FIG. 13 is a side cross-section view of a vehicle roof with an embodiment of a roof fan assembly installed.

FIG. 13 shows an embodiment of a fan assembly 500 mounted in a cross-section of a vehicle roof 518 from the back. Fan assembly 500 is similar to the fan assemblies discussed above. The fan assembly 500 includes a plurality of housing components, including upper housing structure 502, central housing structure 508 and lower housing structure 504. The vents 510 and 512 and control switch 514 are also shown in this embodiment. In the embodiment shown, the lower housing structure 504 includes raised portions configured to fit the bottom surface of the roof 518. The design of the housing components may be configured to fit specific design elements, such as ribs, channels, textures and/or other design elements of the roof 518. Configuring the housing components to fit specific roof designs may facilitate improved seals between the fan assembly 500 and the roof 518.

Figure 14:
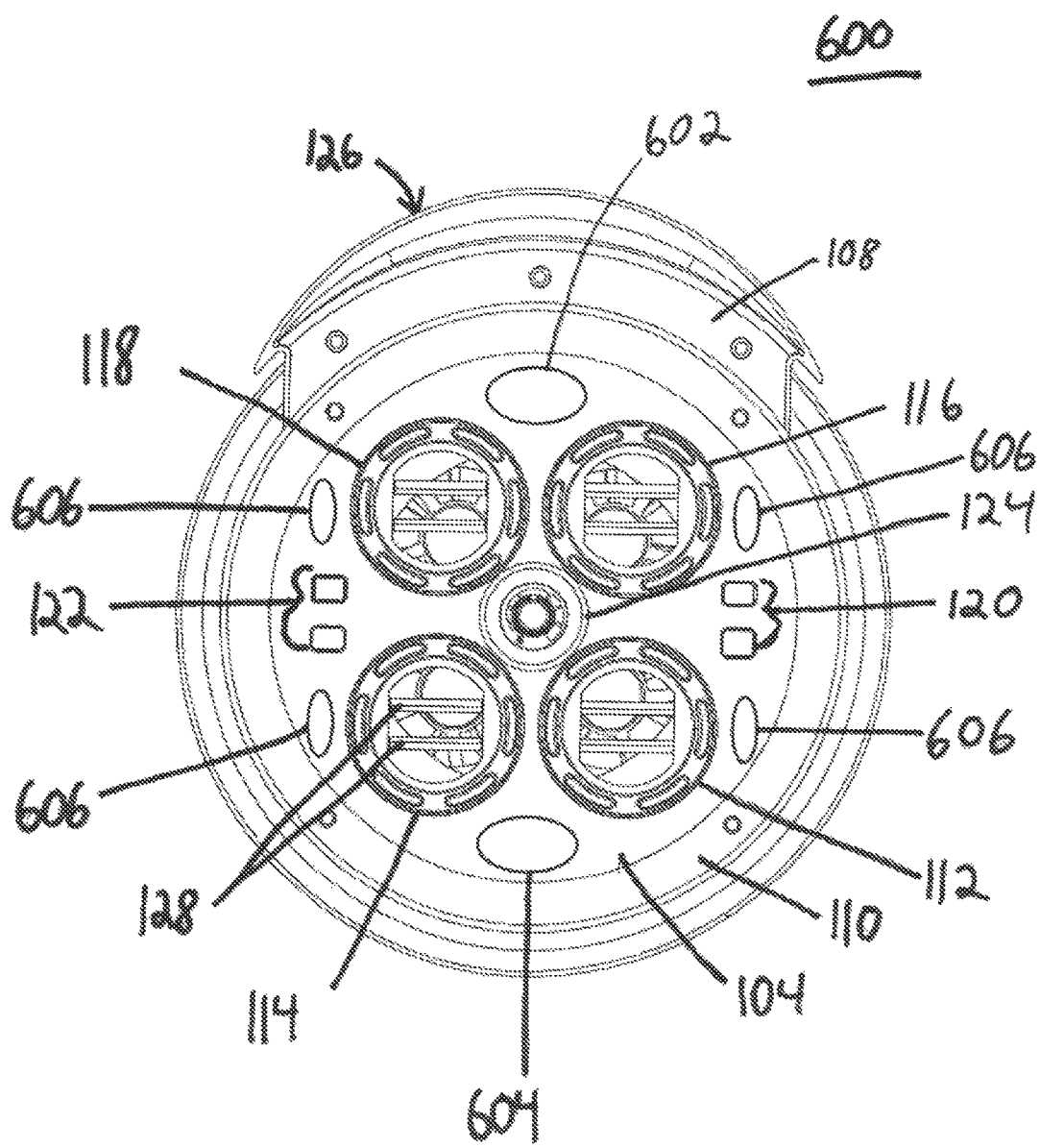
FIG. 14 is a bottom view of an embodiment of a roof fan assembly with lights.

FIG. 14 shows a bottom view of a fan assembly 600. The fan assembly 600 is an alternative embodiment of the fan assembly 100 discussed above and incorporates many of the same elements as the fan assembly 100. In addition to the common elements, the fan assembly 600 includes a plurality of lights including a first light 602, a second light 604 and four auxiliary lights 606. Some embodiments of the fan assembly 600 may include any one or more of the lights 602, 604 and 606. In some embodiments, the location of any of the lights 602, 604 and 606 may be moved to different locations in the lower housing structure 104. One having ordinary skill in the art will understand that the arrangement, configuration, shape, size and/or other characteristics of lights 602, 604 and 606 shown in this embodiment may vary and remain within the scope of the disclosure.

In this embodiment, the first light 602 is located near the front of the fan assembly 600 and the second light 604 is located proximate to the back of the fan assembly 600. The first light 602 may be configured to provide light in the front of a vehicle and the second light 604 may be configured to provide light in the rear of a vehicle. The auxiliary lights 606 are each located adjacent to one of the vents 112-118 in this embodiment. During operation, each of auxiliary lights 606 may be configured to direct light to the same location with which the adjacent vent 112, 114, 116 or 118 is associated.

In some embodiments, the lights 602, 604 and 606 may comprise an array of light-emitting diodes (LEDs) and a lens. Some embodiments may include one or more types of LEDs to provide multiple options for lighting. For example, some embodiments may include a series of white LEDs and another series of red LEDs. In other embodiments, alternative types of lights may be used for the lights 602, 604 and 606. Some embodiments of the apparatus may include multiple types of lighting among lights 602, 604 and 606.

In some embodiments, each light 602, 604 and 606 may also operate as a control interface. For example, a user may press on the surface of the lens of first light 602 to actuate a control switch for the light 602 which operates to turn the light 602 on or off. In some embodiments, the control interface may allow selection of alternative operations, such as color, luminosity, blinking, etc. For example, the user may press on the surface of the lens of second light 604 once to turn the light 604 on. The user may then press the surface again to increase the luminosity of the second light 604. The user may press the surface a third time to cause the second light 604 to blink. Finally, the user may press the surface again to turn off the second light 604. In other embodiments, the functions and control pattern may vary. In addition, the control may be further effected by other factors, such as the side of the lens pressed, how long a user holds the lens in a depressed state and/or other factors.

In some embodiments, each of the auxiliary lights 606 may be independently controlled and operable. For example, each auxiliary light 606 may be associated with a control to turn the specific light 606 on or off. In other embodiments, two or more of the auxiliary lights 606 may be controlled collectively. For example, a first button may be used to control the forward two auxiliary lights 606 and a second button may be used to control the back two auxiliary lights 606. In some embodiments, one or more of the auxiliary lights 606 may be controlled in conjunction with the control of the first light 602 and/or the second light 604. For example, the user may press on the surface of the lens of the first light 602 once to turn the light 602 on. The user may then press the surface again to also turn on the forward two auxiliary lights 606. Finally, the user may press the surface again to turn off the first light 602 and the forward two auxiliary lights 606.

In some embodiments, one or more of the lights 602, 604 and 606 may be controlled by one or more monitoring features. For example, the two auxiliary lights 606 adjacent to optical sensor 120 may be controlled by optical sensor 120 to turn on when a user is present. For another example, the auxiliary lights 606 may turn on based upon a photoelectric or other light sensor.

The lights 602, 604 and 606 may be configured to allow a user to adjust the direction of the light and/or the focal point of the light in some embodiments. For example, the first light 602 may be in a light housing that can tilt along one or more axes relative to the lower housing structure 104. In another example, the second light 604 may include an adjustable lens configured to allow the user to adjust the light output from a wide to a narrow output. Any of the lights 602, 604 and 606 may include one of the above features, other features and/or combinations of features.

Figure 15:
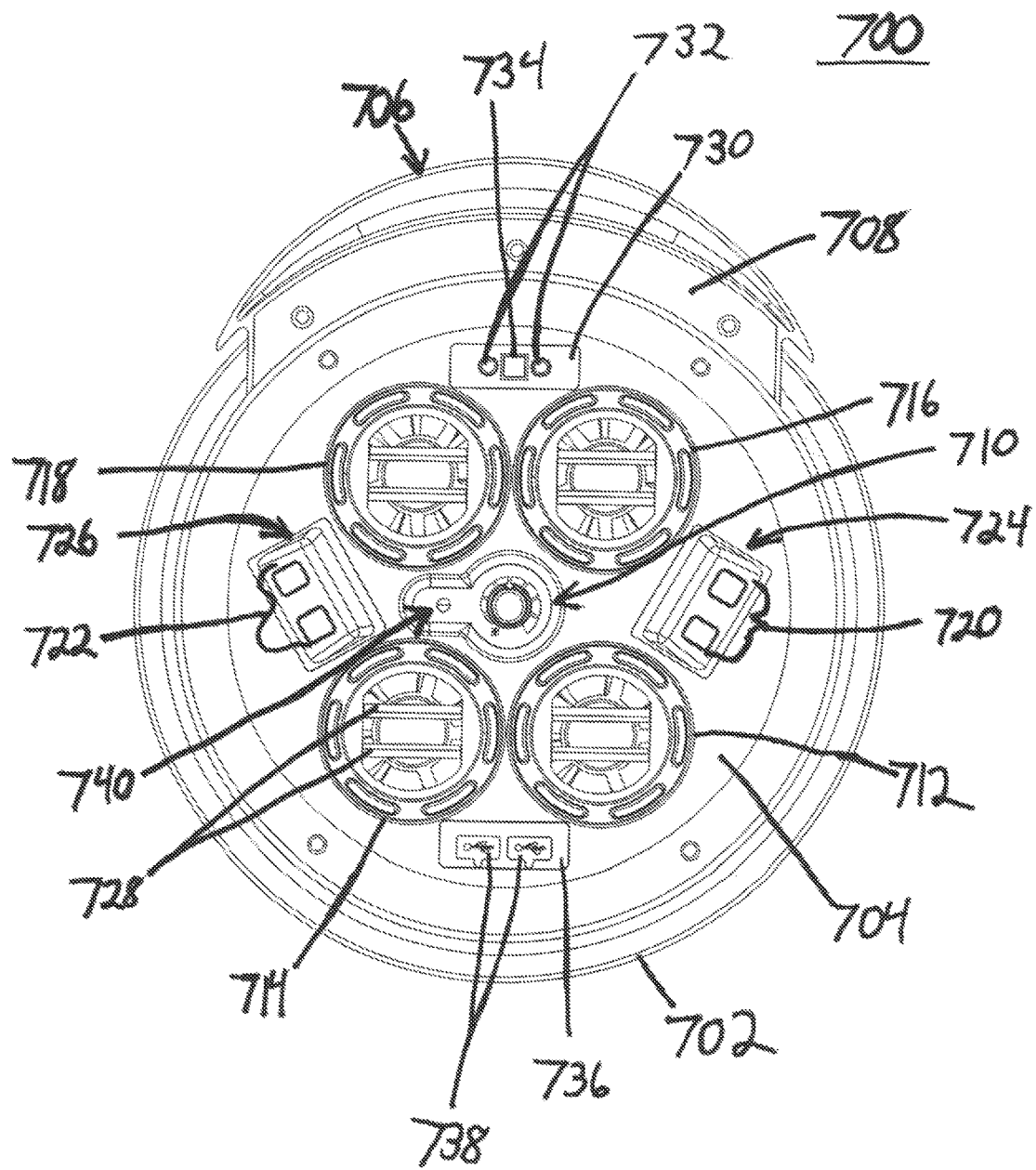
FIG. 15 is a bottom view of another embodiment of a roof fan assembly.
Figure 16:
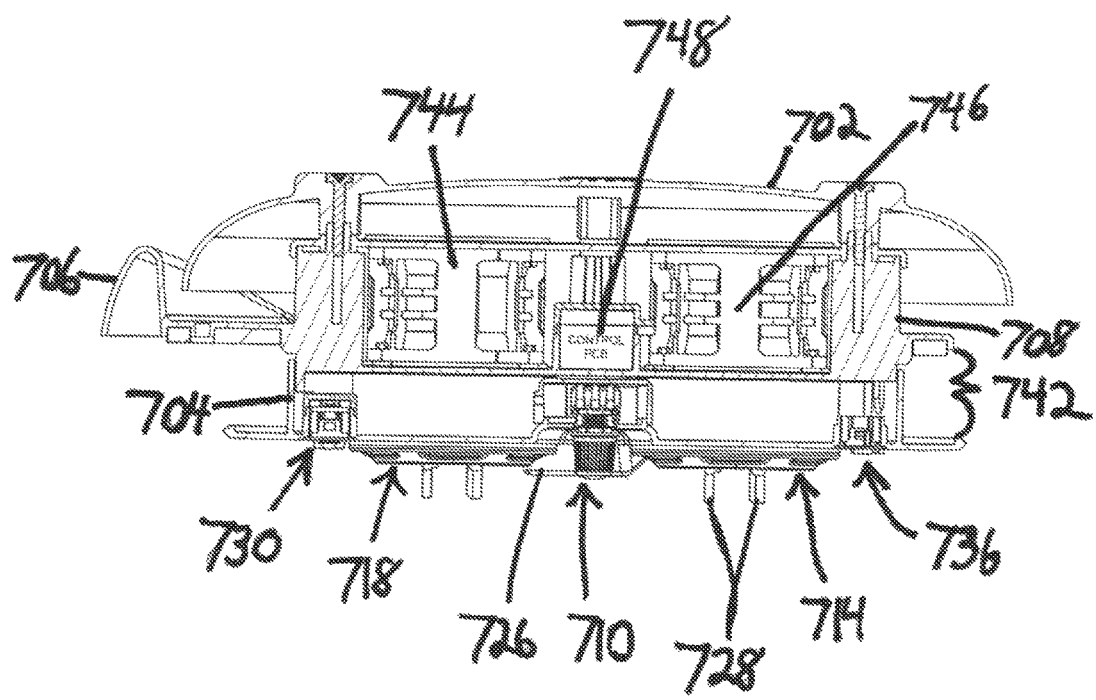
FIG. 16 is a side cross-section view of another embodiment of a roof fan assembly.

FIGS. 15 and 16 show a fan assembly 700. FIG. 15 shows a bottom view of the fan assembly 700 and FIG. 16 shows a side cross-section view of the fan assembly 700. The fan assembly 700 is an alternative embodiment of the fan assemblies discussed above and incorporates many of the same or similar elements. The fan assembly 700 includes a housing including an upper housing structure 702, a central housing structure 708 (including a rain shield 706) and a lower housing structure 704. In the embodiment shown, the fan assembly 700 includes four vents 712, 714, 716 and 718 in the lower housing structure 704 that are in line with four fans (including fans 744 and 746 shown in FIG. 16). As with other embodiments, the vents 712-718 may be rotatable and/or include fins or louvers 728 to direct the air from the vents 712-718. The fan assembly 700 also includes a user control 710 and optical sensors 720 and 722.

In addition to the common elements, the fan assembly 700 includes optical sensor housings 724 and 726, light module 730, electronics port module 736 and an LED 740 that operates as an indicator light. In the embodiment shown, the optical sensor housings 724 and 726 extend below the external surface of the lower housing structure 704 and are configured to hold the eyes or optical sensors 720 and 722 directed to preferred locations in a vehicle. The optical sensors 720 and 722 are each directed outward from the fan assembly 700 at a downward and rearward angle. When installed, this configuration may direct the optical sensors 720 and 722 towards seat locations for the driver and a passenger. In some embodiments, the optical sensor housings 724 and 726 may be rotatable along one or more axes. For example, the optical sensor housings 724 and 726 may rotate around a horizontal axis allowing the angle of the optical sensors 720 and 722 to change from outward to downward (and potentially inward in some embodiments). For another example, the optical sensor housings 724 and 726 may rotate in the plane of the bottom of the lower housing structure 704 (similar to the rotation of vents 712-718).

In some embodiments, one or both of the optical sensor housings 724 and 726 may be optional modules. For example, the fan assembly 700 may include ports that are configured to optionally accept an optical housing 724 or 726. In some embodiments, the ports may include a blank cover to hide the port. The port cover may be removed and replaced with an optical housing 724 including the optical sensor 720. When the optical housing 724 is installed in the port, an electrical connection is created between the control system of the fan assembly 700 and the optical sensor 720.

The fan assembly 700 includes the light module 730 near the front of the fan assembly 700 in this embodiment. As shown, the light module 730 includes two lights 732 and a light control 734. Embodiments may include one light 732 or a plurality of lights 732. The lights 732 may be LEDs, incandescent lights or another type of light. In addition, the color, size, shape and/or luminosity of the lights 732 may vary. In some embodiments, the light control 734 may be a switch, button or other manual control feature. In some embodiments, the light control 734 is a photoelectric or light sensor configured to turn the lighting on or off (or vary the light output) based upon the ambient light.

The fan assembly 700 also includes the electronics port module 736 near the back of the fan assembly 700. In the embodiment shown, the electronics port module 736 includes two universal serial bus (USB) ports 738. Some embodiments may include alternative types of electronics ports or plugs, such as HDMI ports, micro-USB, mini-USB, brand specific ports and/or combinations of ports. These ports 738 may be configured to charge devices, attach accessory components and/or facilitate data input to the fan assembly 700. For example, a user may connect a phone to the fan assembly 700 via a cable connected to one of the USB ports 738. The user may charge their phone and control the operation of the fan assembly 700 via a user interface on the phone.

In some embodiments, the light module 730 and the electronics port module 736 may be optional modules. For example, the fan assembly 700 may include ports that are configured to optionally accept the light module 730, the electronics port module 736 or another module. In some embodiments, the ports may include a blank cover to hide the port. The port cover may be removed and replaced with a selected module—e.g. the light module 730. When the selected module—e.g. the light module 730—is installed in the port, an electrical connection is created between the control system of the fan assembly 700 and the selected module. Accordingly, the fan assembly 700 may be customized. For example, a fan assembly 700 with two ports may include two light modules 730, two electronics port modules 736 or one of each module (as shown). The custom options may be expanded by the option to include alternative modules.

In addition, this embodiment of fan assembly 700 includes the LED 740 configured to indicate an operational status of the fan assembly 700. During operation, the output of LED 740 may change to reflect a different operational state of the device. For example, when the device is powered and turned off, the LED 740 may provide a steady red light. The LED 740 may provide a blue light when the user control 710 is turned on. The LED 740 may provide an orange light when the user control 710 is at a maximum setting. Other embodiments may utilize alternative indications for various states of operation that include blinking patterns, a variety of colors and/or other outputs. Other embodiments may include additional and/or alternative visual outputs to indicate the status of the device. For example, a display may be included to visually show the current operational state of the device. For another example, an array of lights/LEDs may be used wherein each light/LED may indicate different alternative states of operation. In some embodiments, other outputs may be used with or instead of the visual output, such as audible outputs, mechanical outputs and/or other outputs.

FIG. 16 also shows a control module 748. The control module 748 may be an integrated circuit, relay or other control mechanism, to facilitate operation of the fan assembly 700. In the embodiment shown, the control module 748 is illustrated as a printed circuit board (PCB). The control module 748 for the fan assembly 700 modifies the operation of the fan assembly 700 based upon user control signals, sensor signals and/or other control features. In some embodiments, the control module 748 is located in alternative locations of the fan assembly 700.

The control module 748 may receive input signals from any control interface component, including the user control 710, a remote control interface and/or another control component. In addition, the control module 748 may receive input signals from one or more sensor components, including the optical sensors 720 and 722, a temperature sensor, a battery charge sensor and/or another sensor component. The control module 748 controls the output of the fan assembly 700 based upon the input signals it receives and internal control features (e.g., timers, control protocols, etc.). For example, a user may rotate the user control 710 to an on position causing the control module 748 to receive an input signal and, in turn, cause the fans including fans 744 and 746 to turn on. After a few moments, the optical sensor 720 may provide data to a control module 748 indicating the driver is not present, causing the control module 748 to turn off the fans directed to the driver seat. When the optical sensor 720 sends data to the control module 748 indicating the presence of a person in the driver's seat, the control module 748 will turn the associated fans on. For another example, the control module 748 may receive a signal from the battery charge sensor and evaluate the signal to determine if the battery charge is below a threshold level. If the battery charge is below a threshold level, the control module 748 may shut off the fan assembly 700 to conserve the battery charge for the vehicle.

Figure 17:
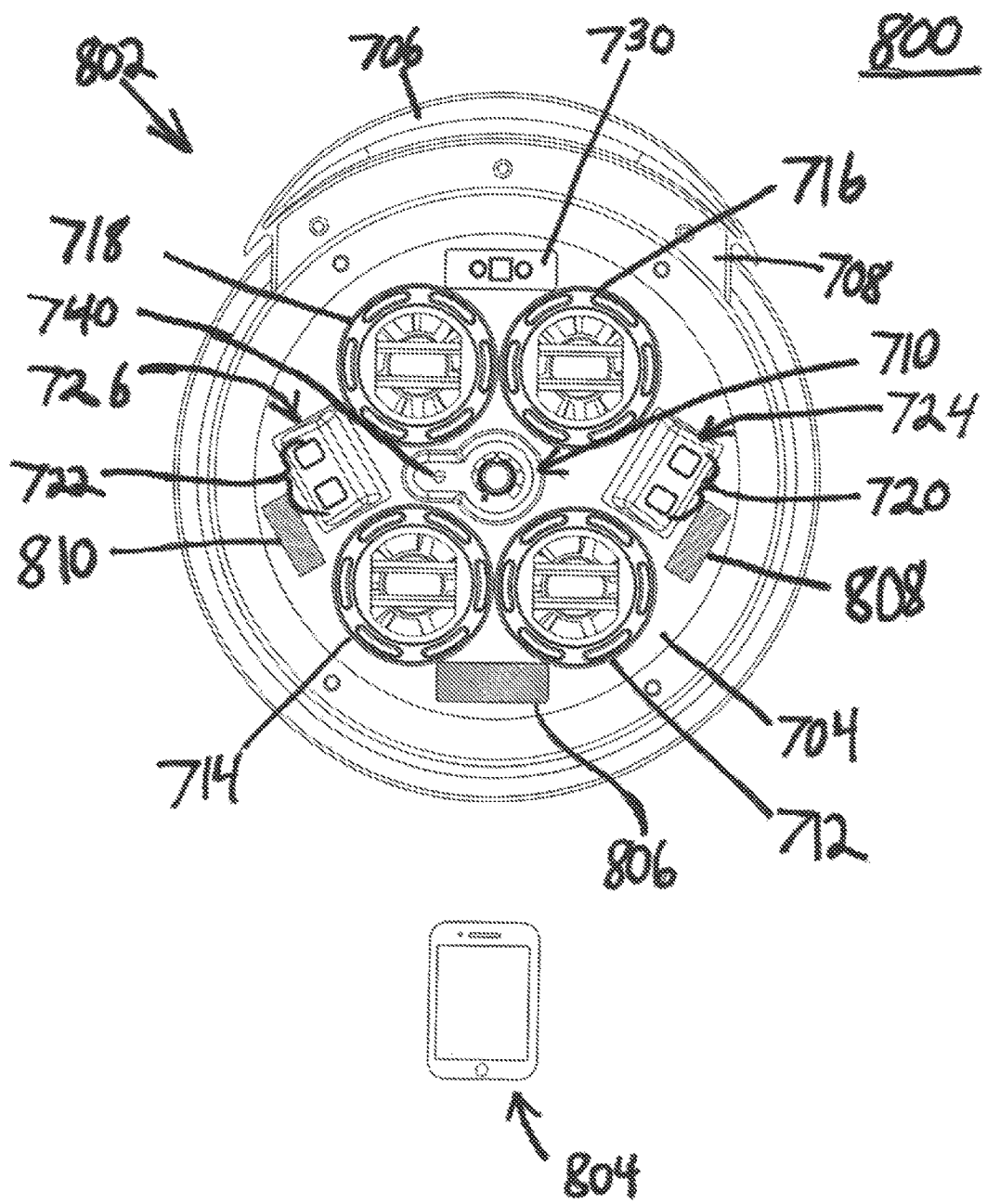
FIG. 17 is a bottom view of another embodiment of a roof fan assembly.

In some embodiments, the control module 748 may include a wireless communication component or module, such as a BLUETOOTH® communication module, a Wi-Fi communication module and/or another communication module. The wireless communication module may be used to facilitate control of the fan assembly 700 and/or monitoring of data in the fan assembly 700 by a remote device, such as a phone as shown in FIG. 17, a remote dashboard control and/or other remote device. In such embodiments, the fan assembly 700 may not include a user control 710.

In some embodiments, the wireless communication module may transmit operational data of the fan assembly 700 and/or the vehicle to a remote device. In such embodiments, a user, supervisor or other person may be able to monitor one or more characteristics of the fan assembly 700 and/or the vehicle remotely. For example, the driver of the vehicle may have a remote display that receives the operational data and displays the data. While the user is away from the vehicle, the display may indicate when one or more fans are cut off based upon the indication from the optical sensor 720 that the driver is not present and show a battery charge level for the vehicle. For another example, a golf course employee may remotely monitor battery charge levels for the course's golf carts.

In some embodiments, one or more remote devices may be integrated with a paired communication chip including one or more security features. In some embodiments, a user may pair one or more devices with the communication module in the control module 748 using pairing protocols. Once a device is paired with the fan assembly 700, the fan assembly 700 may automatically pair with the device based upon one or more initialization processes. For example, a previously paired device may automatically pair with the fan assembly 700 when the fan assembly 700 is powered on and the device is within a threshold distance.

FIG. 17 shows a fan assembly system 800 with a fan assembly 802 and a phone 804. The fan assembly 802 is an alternative embodiment of the fan assembly 700 discussed above and incorporates many of the same elements as the fan assembly 700. In addition to the common elements, the fan assembly 802 includes a plurality of speakers including a first speaker 806, a second speaker 808 and a third speaker 810. Some embodiments of the fan assembly 802 may include any one or more of the speakers 806-810. In some embodiments, the location of any of the speakers 806-810 may be moved to different locations in the lower housing structure 704. In some embodiments, a speaker may be installed in the upper housing structure 702 or central housing structure 708. One having ordinary skill in the art will understand that the arrangement, configuration, shape, size and/or other characteristics of speakers 806-810 shown in this embodiment may vary and remain within the scope of the disclosure.

In some embodiments, the speakers 806-810 may be modular components that are optional. For example, the first speaker 806 in this embodiment is located in the position of the electronics port module 736 shown in FIG. 15. In some embodiments, a user may customize their fan assembly 802 through the selection and placement of preferred modules. In addition, a user may be able to modify their fan assembly 802 by removing one module and replacing it with an alternative module.

The fan assembly system 800 includes the phone 804. In some embodiments, the phone 804 may be a smartphone, a tablet, a computer, a watch or another wireless phone or computing device. In the embodiment shown, the phone 804 is operable to wirelessly connect to the fan assembly 802. In some embodiments, the phone 804 may be connected to the fan assembly 802 via a wired connection. For example, a wire connected from the phone 804 to an electronics port, such as the USB ports 738 shown in FIG. 15.

In some embodiments, the phone 804 operates as a remote control device to operate one or more features of the fan assembly 802. For example, the phone 804 may include hardware and/or a software application to facilitate turning one or more of the fans on or off. In addition, the phone 804 may be operable to vary the fan speed and/or other modes of operation for the fan assembly 802. For example, in embodiments of the fan assembly 802 incorporating heating and/or cooling elements, the phone 804 may be operable to control the heating and cooling functions of the fan assembly 802. During operation, a user may turn on the driver's side fans when the user is about to return to the driver's seat in order for the airflow to begin prior to the user's return. As another example, the phone 804 may be operable to send music or other audio to the fan assembly 802 in order to play the music or audio through the speakers 806-810. For another example, the fan assembly system 800 may be configured to play a ringtone through the speakers 806-810 so that the user will know there is an incoming call on the phone 804. The phone 804 may also be used to turn on the light module 730 and control the light output.

In some embodiments, the phone 804 may be operable to set parameters and/or operational features of the fan assembly 802. In some embodiments, a user may set the time for one or more fans to operate after an optical sensor 720 or 722 indicates a user is no longer present. Embodiments may allow a user to set alarms related to usage of the fan assembly 802, vehicle data (e.g. battery charge, etc.). For example, a user may set an alarm to trigger immediately prior to shutting a fan off due to a sensor reading (e.g. an optical sensor, temperature sensor, etc.). As another example, the user may set a battery charge alarm setting at the user's selected charge level. In some embodiments, the phone 804 may display a control option to easily turn fans back on that have shut off while the user was away from the vehicle.

In some embodiments, the phone 804 is operable as a remote monitoring device for the fan assembly 802 and/or features of the vehicle. The monitoring application of the phone 804 may provide a user with operational data including fan settings, operational mode, person presence indications, auxiliary feature settings of the fan assembly 802 (e.g. lights, electronic port usage, speaker usage, etc.), vehicle battery charge level, ambient temperature level, output temperature level and/or other operational data. For example, the monitoring feature may show two of the fans operating on the passenger side and a hold symbol adjacent to the driver's side fans because no one is detected in the driver's seat. Additionally, the monitoring feature may show an icon indicating the light module 730 is on and the speakers 806-810 are playing audio at a select output level. The monitoring feature may also show a vehicle battery charge level along with an estimated battery life. In some embodiments, the monitoring feature may show an estimated battery life based upon the time until or charge level when the fan assembly 802 will be shut off to allow sufficient battery life to return the vehicle to a charging location. Some embodiments may also show sensor data including ambient temperature, fan assembly 802 output temperature, light levels and/or other data.

Some embodiments provide an air conditioning apparatus for a roof of a vehicle. The air conditioning apparatus having a housing configured to attach to said roof with a lower surface on an inside of said vehicle and an upper surface on an outside of said vehicle. The housing has an air inlet and an air outlet on said lower surface. The air conditioning apparatus also having a user interface on said lower surface of the housing configured to facilitate control of the air conditioning apparatus by a user, a fan within the housing between the air inlet and the air outlet configured to move air through said housing from the air inlet to the air outlet, and an optical sensor operably connected to said fan, wherein said optical sensor is configured to sense distance to an object, wherein the operation of said air conditioning apparatus is modified based upon a determination of whether the distance to said object indicates that the user is present. The air conditioning apparatus may include a light in the lower surface of the housing.

In some embodiments, the air conditioning apparatus may include a plurality of said fans, wherein each of said plurality of said fans is independently controllable. Embodiments of the air conditioning apparatus may also include a second optical sensor. In such embodiments, the optical sensor is operably connected to a first fan of said plurality of said fans and is configured to sense distance to a first object and said first fan is configured to direct air toward said first object based upon a first said determination that a first said user is present. In addition, the second optical sensor is operably connected to a second fan of said plurality of said fans and wherein said second optical sensor is configured to sense distance to a second object and said second fan is configured to direct air toward said second object based upon a second said determination that a second said user is present.

Embodiments of the air conditioning apparatus having a plurality of fans may also include a separation wall configured to direct air from one of said plurality of said fans to one of a plurality of air vents. Some embodiments of the air conditioning apparatus having a plurality of fans may include a duct configured to direct air from one of said plurality of said fans to one of a plurality of air vents.

In some embodiments of the air conditioning apparatus, the housing is attached to a top of said roof. In some embodiments of the air conditioning apparatus, the housing is attached to a bottom of said roof.

The air conditioning apparatus may include a plurality of said air outlets wherein each said air outlet includes an air vent. Each said air vent may be adjustable to allow a user to alter the direction of airflow out of said air vent.

Embodiments of the air conditioning apparatus may include a heater configured to heat air within said air conditioning apparatus. Some embodiments of the air conditioning apparatus may include a cooling device configured to cool air within said air conditioning apparatus. Some embodiments of the air conditioning apparatus may include a misting device configured to provide a mist into the air within said air conditioning apparatus.

Some embodiments of the air conditioning apparatus may include a power source. The power source may be a solar cell. Embodiments of the air conditioning apparatus may include a battery. Some embodiments of the air conditioning apparatus may include a power connection operably connecting the air conditioning apparatus to a power source of said vehicle. In some embodiments, the vehicle is an electric vehicle and said air conditioning apparatus is operably connected to a battery of said electric vehicle. In some embodiments, the vehicle is at least one of a golf cart, an all-terrain vehicle, tractor, electric car and/or boat.

In some embodiments, the air conditioning apparatus includes a rain shield. Embodiments of the housing may include an upper housing structure, a central housing structure and a lower housing structure.

In some embodiments, the air conditioning apparatus includes a plurality of lights, with each of the plurality of lights being independently controllable. Embodiments of the air conditioning apparatus may also include a second optical sensor. In such embodiments, the optical sensor is operably connected to a first light of said plurality of said lights and is configured to sense distance to a first object and said first light is directed toward said first object based upon a first said determination that a first said user is present. In addition, the second optical sensor is operably connected to a second light of said plurality of said lights and wherein said second optical sensor is configured to sense distance to a second object and said second light is directed toward said second object based upon a second said determination that a second said user is present.

Some embodiments include a light control configured to control the operations of the light. The light may be operable as the light control by pressing the surface of the light. In some embodiments, the light may be adjustable to allow a user to alter an output direction of the light. The light may be adjustable to allow a user to alter the focus of the light in some embodiments. In some embodiments, the air conditioning apparatus may include a photoelectric sensor.

Some embodiments provide an air conditioning apparatus for a roof of a vehicle. The air conditioning apparatus having a housing configured to attach to said roof with a lower surface and an upper surface. The housing has an air inlet and an air outlet. The air conditioning apparatus also having a fan within the housing between the air inlet and the air outlet configured to move air through said housing from the air inlet to the air outlet, and an optical sensor operably connected to said fan, wherein said optical sensor is configured to sense distance to an object, wherein the operation of said air conditioning apparatus is modified based upon a determination of whether the distance to said object indicates that the user is present. The air conditioning apparatus may include a plurality of lights in the lower surface of the housing.

Some embodiments provide an air conditioning apparatus for a roof of a vehicle. The air conditioning apparatus having a housing configured to attach to said roof with a lower surface on an inside of said vehicle and an upper surface on an outside of said vehicle. The housing has an air inlet and an air outlet. The air conditioning apparatus includes a control module configured to facilitate control of the air conditioning apparatus by a user. The air conditioning apparatus also having a fan within the housing between the air inlet and the air outlet configured to move air through said housing from the air inlet to the air outlet, and an optical sensor operably connected to said fan, wherein said optical sensor is configured to sense distance to an object, wherein the operation of said air conditioning apparatus is modified based upon a determination of whether the distance to said object indicates that the user is present.

Some embodiments of the air conditioning apparatus include a replaceable module port. Embodiments may include a replaceable module configured to engage the replaceable module port and operatively connect with the control module when engaged with the replaceable module port. In some embodiments, the replaceable module is a light module. In some embodiments, the replaceable module is an electronics port module. In some embodiments, the replaceable module is a speaker module.

Some embodiments of the air conditioning apparatus include a wireless communication module operatively connected to the control module, wherein the wireless communication module is operable to wirelessly communicate with a remote device. The remote device may be operable to control an operation of the air conditioning apparatus. In some embodiments, the remote device displays an operational characteristic of the air conditioning apparatus. In some embodiments, the remote device displays an operational characteristic of the vehicle.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the apparatus described.

The invention claimed is:

1. An air conditioning apparatus for a roof of an open air vehicle comprising:
   a housing comprising an upper housing structure, a central housing structure and a lower housing structure, wherein said housing is configured to attach to said roof with a lower surface of said lower housing structure on an inside of said open air vehicle and an upper surface of said upper housing structure on an outside of said open air vehicle, wherein said housing has an air inlet and an air outlet, wherein said air outlet is on said lower surface, and said air inlet comprises an opening between said upper housing structure and said central housing structure such that air flows underneath an outer edge of said upper housing structure;
   a user interface on said lower surface of the lower housing structure configured to facilitate control of the air conditioning apparatus by a user;
   a fan within the housing between the air inlet and the air outlet configured to move said air through said housing from the air inlet to the air outlet;
   an optical sensor in said lower surface of the lower housing structure operably connected to said fan, wherein said optical sensor is configured to sense distance to an object, wherein an operation of said air conditioning apparatus stops based upon a determination that the distance to said object indicates that the user is not present, and wherein the operation starts if the distance to said object indicates the user is present; and
   a rain shield in front of said air inlet on a forward side of said air conditioning apparatus such that the air flows over said rain shield prior to entering said air inlet.

2. The air conditioning apparatus according to claim 1, comprising a plurality of said fans, wherein each of said plurality of said fans is independently controllable.

3. The air conditioning apparatus according to claim 2, comprising a second optical sensor in said lower surface of the lower housing structure, wherein said optical sensor is operably connected to a first fan of said plurality of said fans and wherein said optical sensor is configured to sense distance to a first object and said first fan is configured to direct said air toward said first object based upon a first determination that a first user is present; and
   wherein said second optical sensor is operably connected to a second fan of said plurality of said fans and wherein said second optical sensor is configured to sense distance to a second object and said second fan is configured to direct said air toward said second object based upon a second determination that a second user is present.

4. The air conditioning apparatus according to claim 2, comprising at least one of a separation wall and a duct configured to direct said air from one of said plurality of said fans to one of a plurality of air vents.

5. The air conditioning apparatus according to claim 1, comprising a plurality of said air outlets wherein each said air outlet includes an air vent.

6. The air conditioning apparatus according to claim 1, comprising a heater configured to heat said air within said air conditioning apparatus.

7. The air conditioning apparatus according to claim 1, comprising at least one of a cooling device configured to cool said air within said air conditioning apparatus and a misting device configured to provide a mist into the air within said air conditioning apparatus.

8. The air conditioning apparatus according to claim 1, comprising a power source.

9. The air conditioning apparatus according to claim 8, wherein said power source is a solar cell.

10. The air conditioning apparatus according to claim 1, comprising a battery.

11. The air conditioning apparatus according to claim 1, comprising a power connection operably connecting the air conditioning apparatus to a power source of said open air vehicle.

12. The air conditioning apparatus according to claim 11, wherein said open air vehicle is an electric vehicle and said air conditioning apparatus is operably connected to a battery of said electric vehicle.

13. The air conditioning apparatus according to claim 1, wherein said open air vehicle is at least one of a golf cart, an all-terrain vehicle, tractor, electric car and/or boat.

14. The air conditioning apparatus according to claim 1, wherein said housing is attached to at least one of a top of said roof and a bottom of said roof.

15. An air conditioning apparatus for a roof of an open air vehicle comprising:
   a housing configured to attach to said roof, wherein said housing includes a lower surface on a first housing structure and an upper surface on a second housing structure, wherein said housing has an air inlet and an air outlet in said lower surface, and said air inlet comprises an opening between said second housing structure and said first housing structure such that air flows underneath an outer edge of said second housing structure;
   a rain shield in front of said air inlet on a forward side of said air conditioning apparatus such that the air flows over said rain shield prior to entering said air inlet;
   a fan within the housing between the air inlet and the air outlet configured to move said air through said housing from the air inlet to the air outlet; and
   an optical sensor in said lower surface operably connected to said fan, wherein said optical sensor is configured to sense distance to an object, wherein an operation of said air conditioning apparatus is modified based upon a determination of whether the distance to said object indicates that a user is present, wherein power consumption by said air conditioning apparatus is reduced when the operation is modified based on the determination that the user is not present.

16. The air conditioning apparatus according to claim 1, comprising a heat exchanger that reduces a temperature of the air, which the fan moves through the housing.

17. The air conditioning apparatus according to claim 15, comprising a heat exchanger that reduces a temperature of the air, which the fan moves through the housing.

\* \* \* \* \*